(12) United States Patent
Nagamori

(10) Patent No.: US 10,586,059 B2
(45) Date of Patent: Mar. 10, 2020

(54) SYSTEM, METHOD OF CONTROLLING ACCESS RIGHT, AND INFORMATION PROCESSING APPARATUS

(71) Applicant: Akira Nagamori, Kanagawa (JP)

(72) Inventor: Akira Nagamori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 158 days.

(21) Appl. No.: 15/707,071

(22) Filed: Sep. 18, 2017

(65) Prior Publication Data

US 2018/0089447 A1    Mar. 29, 2018

(30) Foreign Application Priority Data

Sep. 29, 2016   (JP) .................................. 2016-192220

(51) Int. Cl.
*G06F 21/60*   (2013.01)
*G06F 21/55*   (2013.01)
*H04L 29/06*   (2006.01)

(52) U.S. Cl.
CPC .......... *G06F 21/604* (2013.01); *G06F 21/552* (2013.01); *H04L 63/101* (2013.01); *H04L 63/104* (2013.01)

(58) Field of Classification Search
CPC ..... G06F 21/604; G06F 21/552; H04L 63/101
USPC .......................................................... 726/4
See application file for complete search history.

(56) References Cited

U.S. PATENT DOCUMENTS

| | | | | |
|---|---|---|---|---|
| 9,406,034 | B2 * | 8/2016 | Aleong | ................... G06Q 10/06 |
| 2002/0194502 | A1 * | 12/2002 | Sheth | .................... G06F 16/954 |
| | | | | 726/4 |
| 2010/0257206 | A1 * | 10/2010 | Brown | ................ G06F 21/6218 |
| | | | | 707/784 |
| 2011/0055901 | A1 * | 3/2011 | Karaoguz | ............... G06F 21/10 |
| | | | | 726/4 |

(Continued)

FOREIGN PATENT DOCUMENTS

JP    2014-229271    12/2014

OTHER PUBLICATIONS

Keller, "Defining and Monitoring Service Level Agreements for dynamic e-Business", Nov. 2002, LISA, pp. 1-16 (Year: 2002).*

*Primary Examiner* — Alexander Lagor
*Assistant Examiner* — Gregory A Lane
(74) *Attorney, Agent, or Firm* — Harness, Dickey & Pierce, P.L.C.

(57) ABSTRACT

A system to control an access right to apparatus log information of a plurality of output apparatuses includes a memory to store group hierarchical information indicating a hierarchical relationship of a plurality of service-use groups including at least a first service-use group where a first service user belongs, and a second service-use group where a second service user belongs, and group relationship information associating the first service-use group with at least one service provider group where one service provider person belongs, and associating the second service-use group with at least another one service provider group where another service provider person belongs, and circuitry to determine the access right to the apparatus log information of any one of the plurality of output apparatuses for the first service user, the second service user, the one service provider person, and the another one service provider group selectively.

18 Claims, 13 Drawing Sheets

(56) References Cited

U.S. PATENT DOCUMENTS

2013/0174277 A1\* 7/2013 Kiukkonen ........... H04L 63/104
726/28

\* cited by examiner

COUNTER SETTING

| APPARATUS ID | MAC ADDRESS | DAILY DATA ID | ... |

DAILY DATA

| DAILY DATA ID | DATE (YEAR, MONTH, DAY) | COUNT VALUES | | | | | |
|---|---|---|---|---|---|---|---|
| | | TOTAL | EACH FUNCTION | ... | EACH COLOR | ... | EACH SHEET SIZE | ... |

FIG. 9

GROUP INFORMATION

| GROUP ID | GROUP NAME | ADDRESS | TELEPHONE NUMBER | E-MAIL ADDRESS | CLOSING DATE | ... |
|---|---|---|---|---|---|---|

FIG. 10

APPARATUS INFORMATION

| APPARATUS ID | GROUP ID | MAC ADDRESS | DAILY DATA ID | MONTHLY DATA ID | ... |
|---|---|---|---|---|---|

FIG. 11

APPARATUS HISTORY INFORMATION

| APPARATUS ID | UPDATED DATE | GROUP ID | ... |
|---|---|---|---|

FIG. 12

MONTHLY DATA

| MONTHLY DATA ID | DATE (YEAR, MONTH) | COUNT VALUES | | | | | | |
|---|---|---|---|---|---|---|---|---|
| | | TOTAL | EACH FUNCTION | ... | EACH COLOR | ... | EACH SHEET SIZE | ... |

GROUP HIERARCHY INFORMATION

| GROUP ID | PARENT ID | COMPANY ID |

GROUP RELATIONSHIP INFORMATION

| GROUP ID | VENDOR ID |

COUNTER CUBE (OLAP CUBE)      1001

| GROUP NAME | YEAR/MONTH | APPARATUS | COUNTER TYPE | COUNT VALUE |
|---|---|---|---|---|

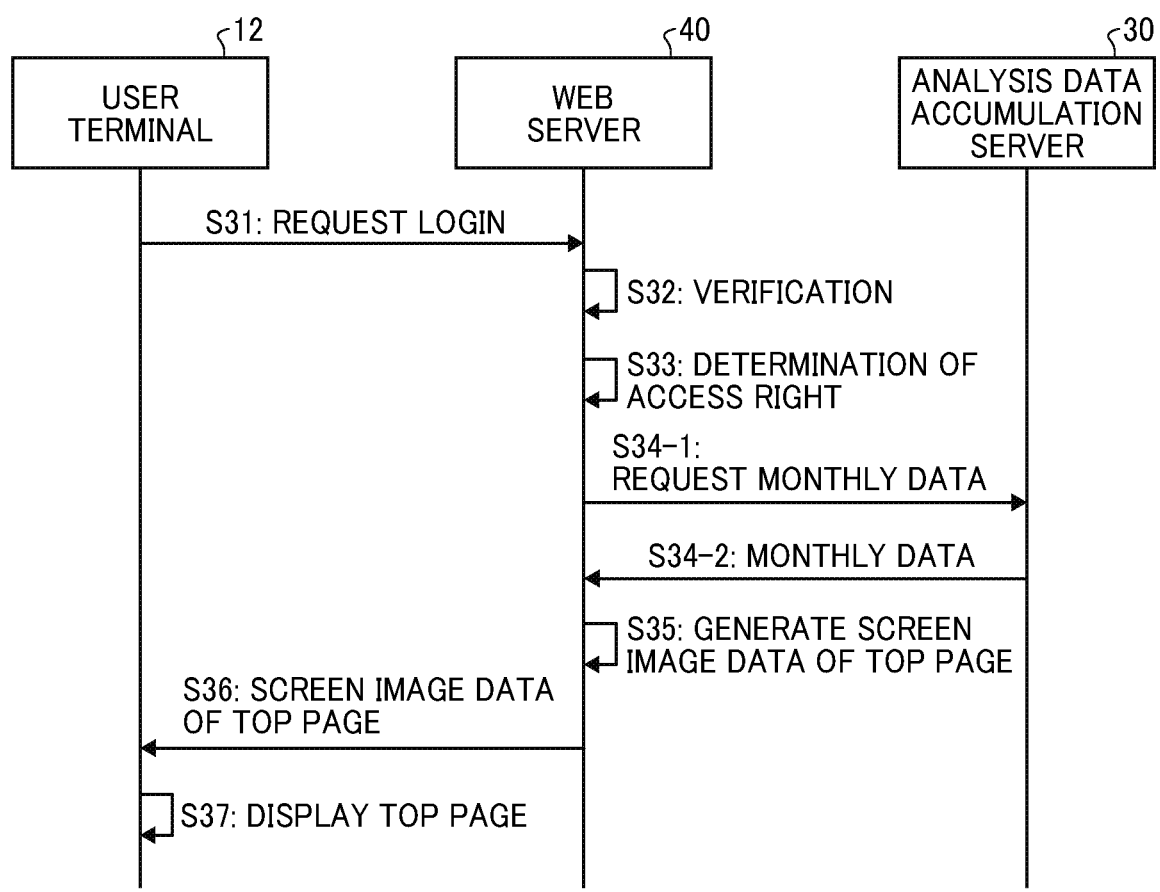

SYSTEM, METHOD OF CONTROLLING ACCESS RIGHT, AND INFORMATION PROCESSING APPARATUS

CROSS-REFERENCE TO RELATED APPLICATION

This application claims priority pursuant to 35 U.S.C. § 119(a) to Japanese Patent Application No. 2016-192220, filed on Sep. 29, 2016 in the Japan Patent Office, the disclosure of which is incorporated by reference herein in its entirety.

BACKGROUND

Technical Field

This disclosure relates to an information processing system, a method of controlling an access right, and an information processing apparatus.

Background Art

Conventionally, information processing systems acquire information from image processing apparatuses used in a user system, and generate and output reports related to the image processing apparatuses used in the user system.

For example, in a case of a service system that supports a user system having image processing apparatuses used for forming and outputting images, the service system is configured to generate reports on operation status information of the image processing apparatuses such as information of number of times of forming images and outputting images, and information of a total cost of the image processing apparatuses. Users that use this service system may be large-scale organizations such as companies having a plurality of sites, departments, and sections, in which the service system is used to generate reports for each one of management units such as each site, and each department.

SUMMARY

As one aspect of the present invention, a system to control an access right to apparatus log information of a plurality of output apparatuses is devised. The system includes a memory to store group hierarchical information indicating a hierarchical relationship of a plurality of service-use groups including at least a first service-use group where a first service user belongs, and a second service-use group where a second service user belongs, and group relationship information associating the first service-use group with at least one service provider group where one service provider person belongs, and associating the second service-use group with at least another one service provider group where another service provider person belongs, and circuitry to determine the access right to the apparatus log information of any one of the plurality of output apparatuses for the first service user, the second service user, the one service provider person, and the another one service provider group selectively. When the circuitry verifies that the first service user has an access right to one or more output apparatuses possessed by the first service-use group, the circuitry sets the access right to the first service user to allow access to the apparatus log information of the one or more output apparatuses possessed by the first service-use group. When the circuitry verifies that the second service user has an access right to one or more output apparatuses possessed by the second service-use group, the circuitry sets the access right to the second service user to allow access to the apparatus log information of the one or more output apparatuses possessed by the second service-use group. When the circuitry verifies that the one service provider person has an access right to any one of the one or more output apparatuses possessed by any one of the first service-use group and the second service-use group, the circuitry sets the access right to the one service provider person to allow access to the apparatus log information of any one of the one or more output apparatuses possessed by any one of the first service-use group and the second service-use group based on the group relationship information. When the circuitry verifies that the another one service provider person has an access right to any one of the one or more output apparatuses possessed by any one of the first service-use group and the second service-use group, the circuitry sets the access right to the another one service provider person to allow access to the apparatus log information of any one of the one or more output apparatuses possessed by any one of the first service-use group and the second service-use group based on the group relationship information.

As another aspect of the present invention, a method of controlling an access right to apparatus log information of a plurality of output apparatuses is devised. The method includes storing group hierarchical information indicating a hierarchical relationship of a plurality of service-use groups including at least a first service-use group where a first service user belongs, and a second service-use group where a second service user belongs, and group relationship information associating the first service-use group with at least one service provider group where one service provider person belongs, and associating the second service-use group with at least another one service provider group where another service provider person belongs in a memory determining the access right to the apparatus log information of any one of the plurality of output apparatuses for the first service user, the second service user, the one service provider person, and the another one service provider group selectively, setting the access right to the first service user to allow access to the apparatus log information of one or more output apparatuses possessed by the first service-use group when successfully verifying that the first service user has the access right to the one or more output apparatuses possessed by the first service-use group, setting the access right to the second service user to allow access to the apparatus log information of one or more output apparatuses possessed by the second service-use group when successfully verifying that the second service user has the access right to the one or more output apparatuses possessed by the second service-use group, setting the access right to the one service provider person to allow access to the apparatus log information of any one of the one or more output apparatuses possessed by any one of the first service-use group and the second service-use group based on the group relationship information when successfully verifying that the one service provider person has the access right to any one of the one or more output apparatuses possessed by any one of the first service-use group and the second service-use group, and setting the access right to the another one service provider person to allow access to the apparatus log information of any one of the one or more output apparatuses possessed by any one of the first service-use group and the second service-use group based on the group relationship information when successfully verifying that the another one service provider person has the access right to any one of the one or more output apparatuses possessed by any one of the first service-use group and the second service-use group.

As another aspect of the present invention, an information processing apparatus to control an access right to apparatus log information of a plurality of output apparatuses is devised. The information processing apparatus includes a memory to store group hierarchical information indicating a hierarchical relationship of a plurality of service-use groups including at least a first service-use group where a first service user belongs, and a second service-use group where a second service user belongs, and group relationship information associating the first service-use group with at least one service provider group where one service provider person belongs, and associating the second service-use group with at least another one service provider group where another service provider person belongs, and circuitry to determine the access right to the apparatus log information of any one of the plurality of output apparatuses for the first service user, the second service user, the one service provider person, and the another one service provider group selectively. When the circuitry verifies that the first service user has an access right to one or more output apparatuses possessed by the first service-use group, the circuitry sets the access right to the first service user to allow access to the apparatus log information of the one or more output apparatuses possessed by the first service-use group. When the circuitry verifies that the second service user has an access right to one or more output apparatuses possessed by the second service-use group, the circuitry sets the access right to the second service user to allow access to the apparatus log information of the one or more output apparatuses possessed by the second service-use group. When the circuitry verifies that the one service provider person has an access right to any one of the one or more output apparatuses possessed by any one of the first service-use group and the second service-use group, the circuitry sets the access right to the one service provider person to allow access to the apparatus log information of any one of the one or more output apparatuses possessed by any one of the first service-use group and the second service-use group based on the group relationship information. When the circuitry verifies that the another one service provider person has an access right to any one of the one or more output apparatuses possessed by any one of the first service-use group and the second service-use group, the circuitry sets the access right to the another one service provider person to allow access to the apparatus log information of any one of the one or more output apparatuses possessed by any one of the first service-use group and the second service-use group based on the group relationship information.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 9 is an example of a configuration of group information;

FIG. 10 is an example of a configuration of apparatus information;

FIG. 11 is an example of a configuration of apparatus history information;

FIG. 12 is an example of a configuration of monthly data;

FIG. 18 is an example of a sequential chart of displaying a Web page;

Figure 1:
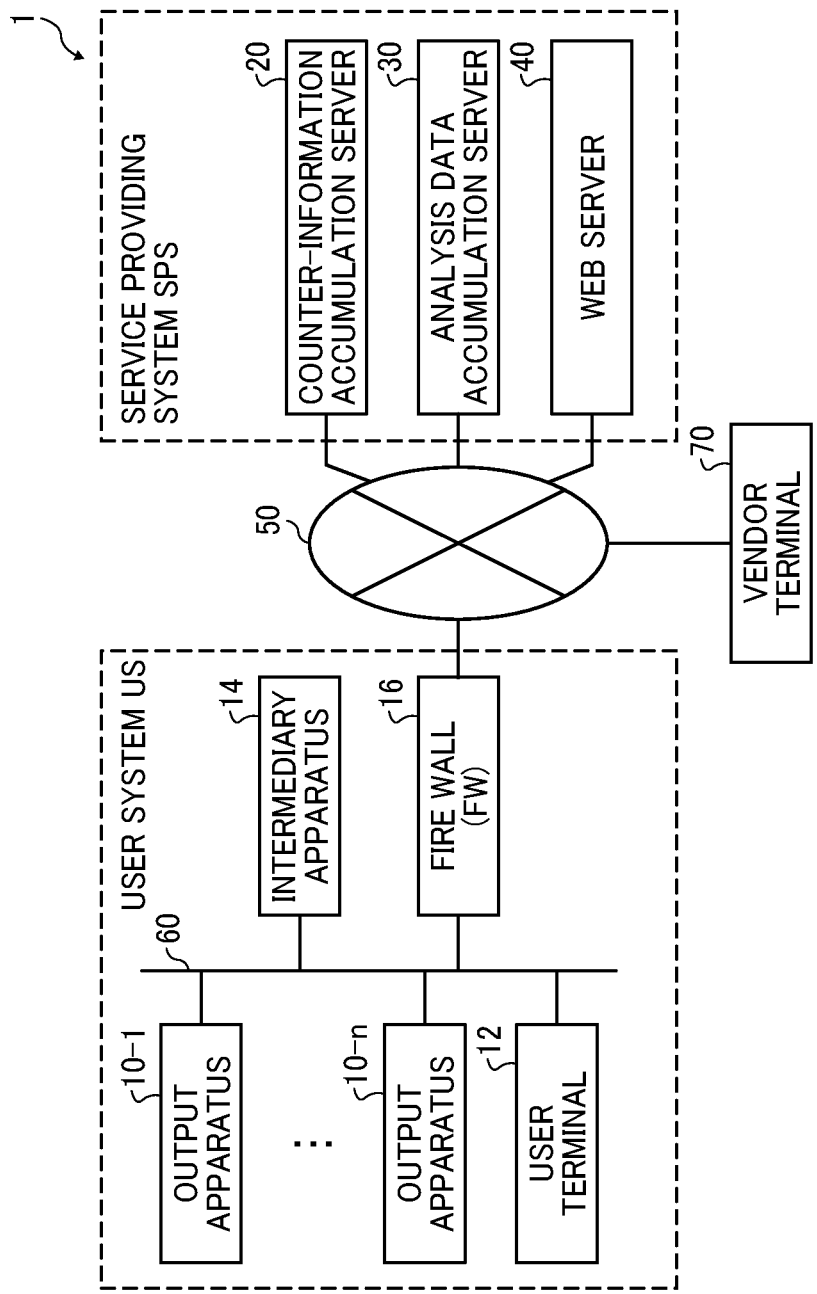
FIG. 1 is an example of a block diagram of an information processing system of an embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of one or more embodiments of the present disclosure with reference to drawings.
(System Configuration)

FIG. 1 is an example of a configuration of an information processing system 1 of an embodiment. As illustrated in FIG. 1, the information processing system 1 includes, for example, a user system US used in a user environment, and a service providing system SPS that provides services to the user system US, which are connected with each other via a network 50 such as the Internet wirelessly and/or by wire. The user system US is used by one or more users that receive various services from the service providing system SPS. The users include various organizations such as enterprises, companies, groups, educational institutions, government agencies and departments, but not limited thereto. As illustrated in FIG. 1, the user system US includes, for example, one or more output apparatuses 10, a user terminal 12, an intermediary apparatus 14, and a fire wall (FW) 16 connected with each other via a network 60 such as local area network (LAN) wirelessly and/or by wire. Further, the service providing system SPS includes, for example, a counter-information accumulation server 20, an analysis data accumulation server 30, and a Web server 40 connected to the network 50 wirelessly and/or by wire. In this description, it is assumed that a plurality of groups exists in the user system US, and the user system US may be one entity. Further, the number of the user system US connected to the network 50 can be any numbers such as one, two, three, and so on.

Further, in the configuration of FIG. 1, a vendor terminal 70 operated by a vendor person of a vendor company (hereinafter, vendor) connected to the network 50 wirelessly or by wire. In this description, the vendor is an example of a service provider that provides one or more services to one or more users. The user is an example of a service user that uses one or more services provided by the service provider. Hereinafter, the service may mean one service or a plurality of services.

Each one of the output apparatuses 10 is, for example, an image forming apparatus such as a laser printer, a multi-functional apparatus (e.g., multifunctional printer), a projector, an electronic information board, a video conference apparatus, a camera, an industrial or home appliance including a communication function, and a medical device including a communication function, but not limited thereto. The user terminal 12 used by a user is, for example, an information processing apparatus such as a smart phone, a mobile phone, a tablet personal computer (PC), a desktop PC, and a notebook PC, but not limited thereto. The user terminal 12 includes one or more applications such as a Web Browser having a function to display data received from the Web server 40 on a display of the user terminal 12. The one or more applications having the function to display data received from the Web server 40 on the display of the user terminal 12 is not limited to the Web browser, but can be other applications that can display data received from the Web server 40 on the display of the user terminal 12.

Further, the intermediary apparatus 14 collects apparatus log information of each one of the output apparatuses 10 from each one of the output apparatuses 10, and transmits the collected apparatus log information of the output apparatuses 10 collectively to the counter-information accumulation server 20. Further, each one of the output apparatuses 10 can be configured to transmit the apparatus log information to the counter-information accumulation server 20 without using the intermediary apparatus 14, in which the intermediary apparatus 14 can be omitted from the information processing system 1. In this description, the apparatus log information is a collection of information such as a plurality of count values counted each time the output apparatus is used. Hereinafter, the count value or the count values are used for this description.

The counter-information accumulation server 20 accumulates the count values (i.e., apparatus log information) of each one of the output apparatuses 10 received from the user system US by using an online transaction processing (OLTP) table to be described later. For example, the OLTP table accumulates the count values counted for each one of the output apparatuses 10 as daily data. The analysis data accumulation server 30 uses the OLTP table of the counter-information accumulation server 20 to generate an online analytical processing (OLAP) cube to be described later. For example, the OLAP cube accumulates monthly data, generated from the daily data accumulated in the OLTP table, by using a closing date as a reference date.

Further, the Web server 40 acquires the daily data and the monthly data of each one of groups that uses each one of the output apparatuses 10 from the OLTP table of the counter-information accumulation server 20 and/or the OLAP cube of the analysis data accumulation server 30. The Web server 40 generates a screen image data used for displaying the daily data and the monthly data on a display of the user terminal 12, and transmits the screen image data to the user terminal 12.

The vendor terminal 70 is an information processing apparatus or device such as a smartphone, a mobile phone, a tablet PC, a desktop PC, a notebook PC or the like used by a vendor person of a vendor. The vendor terminal 70 is installed with an application having a screen display function such as a Web browser.

Further, the configuration of the information processing system 1 illustrated in FIG. 1 is just one example. In another configuration, one or more servers such as a proxy server and a gateway server can be disposed between the user system US and the counter-information accumulation server 20. Further, the user terminal 12 can be disposed or used outside the user system US, in which, for example, the user terminal 12 can be connected to the network 50 wirelessly or by wire. Further, the counter-information accumulation server 20, the analysis data accumulation server 30, and the Web server 40 of FIG. 1 can be integrated as one information processing apparatus, or can be disposed separately using a plurality of information processing apparatuses.

For example, a part or all of the functions of the counter-information accumulation server 20 can be included in any one of the analysis data accumulation server 30, the Web server 40, and other server. Further, a part or all of the functions of the analysis data accumulation server 30 can be included in any one of the counter-information accumulation server 20, the Web server 40, and other server. Further, a part or all of the functions of the Web server 40 can be included in any one of the counter-information accumulation server 20, the analysis data accumulation server 30, and other server.

As to the information processing system 1 of the embodiment, daily data of each one of the output apparatuses 10 are collected to the counter-information accumulation server 20. The analysis data accumulation server 30 acquires the daily data from the counter-information accumulation server 20, and generates the monthly data of each one of groups and each one of the output apparatuses 10. Then, the Web server 40 generates a Web page including information of the monthly data of each one of groups and each one of the output apparatuses 10, and displays the Web page on the display of the user terminal 12 by using the Web browser installed in the user terminal 12. In this description, the daily data can be used as primary data, and data such as monthly data generated from the primary data (e.g. daily data) can be used as secondary data, which means the secondary data is generated from the primary data.

(Hardware Configuration)
(Computer)

Figure 2:
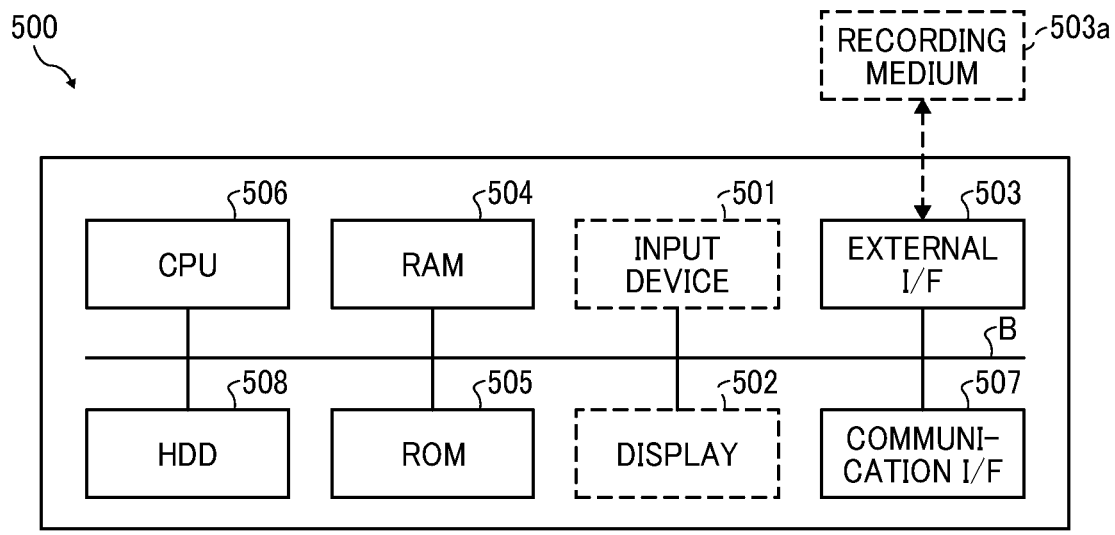
FIG. 2 is a hardware configuration diagram of an example of a computer.

The user terminal 12 of FIG. 1 can be implemented or devised, for example, by a computer having a hardware configuration illustrated in FIG. 2. Further, each of information processing apparatuses that implements or devises the counter-information accumulation server 20, the analysis data accumulation server 30, or the Web server 40 can be also implemented or devised by the computer having the hardware configuration illustrated in FIG. 2.

FIG. 2 is an example of a hardware block diagram of a computer 500 of the embodiment. As illustrated in FIG. 2, the computer 500 includes, for example, an input device 501, a display 502, an external interface (I/F) 503, a random access memory (RAM 504), a read only memory (ROM) 505, a central processing unit (CPU) 506, a communication interface (I/F) 507, and a hard disk drive (HDD) 508 connected with each other via a bus B. Further, the input device 501 and the display 502 can be connected to the bus B only when the input device 501 and the display 502 are necessary.

The input device 501 includes, for example, a keyboard and a mouse, and a touch panel. The input device 501 is used by a user to input each operation signal. The display 502 includes, for example, a display panel to display a result processed by the computer 500.

The communication I/F 507 is an interface to connect the computer 500 to various networks wirelessly or by wire, with which the computer 500 can perform data communication via the communication I/F 507.

Further, the HDD 508 is an example of a non-volatile storage device or memory that stores programs and/or data. The stored programs and/or data include, for example, an operating system (OS) that is the basic software used for controlling the computer 500, application software programs (hereinafter, application) that are executed on the OS to provide various functions. Further, the computer 500 can employ a drive device such as a solid-state drive (SSD) using a flash memory as a memory or a storage device instead of the HDD 508.

The external I/F 503 is used as an interface with an external apparatus or device. The external apparatus or device includes, for example, a recording medium 503a. With this configuration, the computer 500 can read and write data with the recording medium 503a via the external I/F 503. The recording medium 503a includes, for example, a flexible disk, a compact disk (CD), a digital versatile disk (DVD), a secure digital (SD) memory card, and a universal serial bus (USB) memory.

The ROM 505 is an example of a non-volatile semiconductor memory (storage device) that can retain programs and/or data even when the power is turned off. The ROM 505 stores programs and/or data such as basic input/output system (BIOS) to be executed when activating the computer 500, operating system (OS) settings, and network settings. The RAM 504 is an example of a volatile semiconductor memory (storage device) that temporarily stores programs and/or data.

The CPU 506 reads programs and/or data from the storage device such as the ROM 505 and the HDD 508 to the RAM 504, and executes the programs to implement controlling and functions of the computer 500 as a whole.

Each of the user terminal 12, the vendor terminal 70, the counter-information accumulation server 20, the analysis data accumulation server 30 and the Web server 40, implemented or devised by the computer 500 having the hardware configuration illustrated in FIG. 2, can perform various processing to be described later.

(Output Apparatus)

Figure 3:
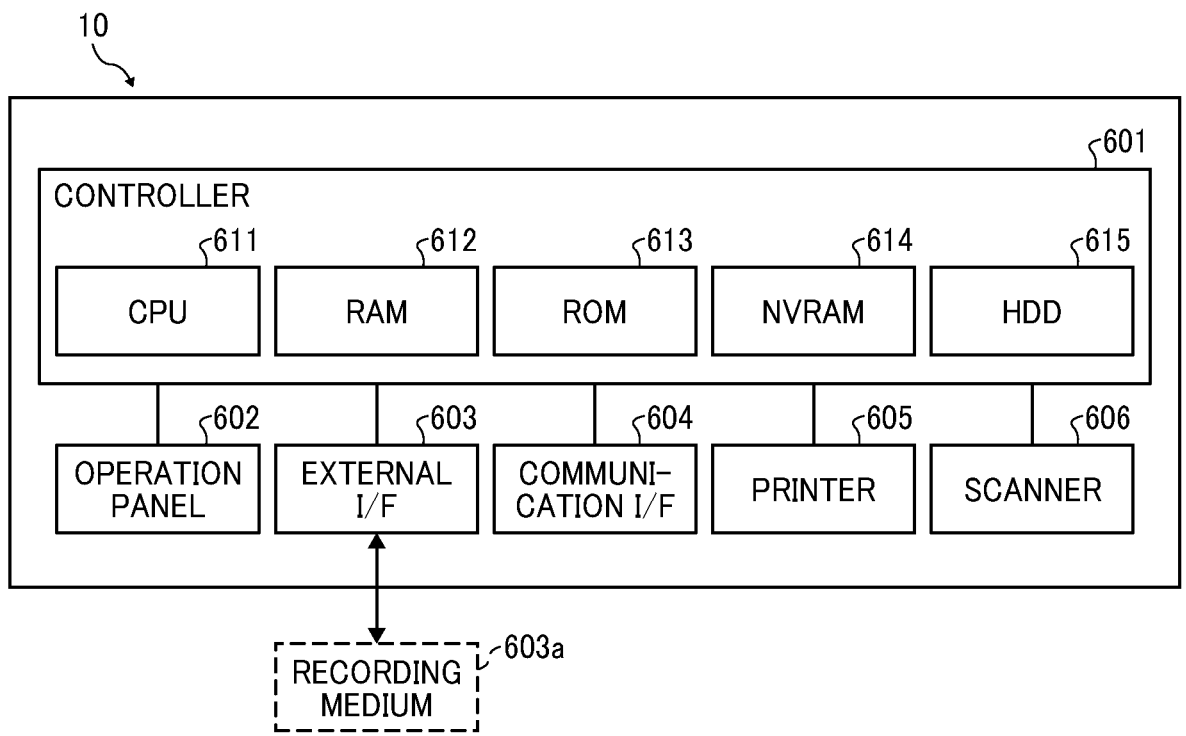
FIG. 3 is an example of a hardware configuration diagram of an output device.

The output apparatus 10 of FIG. 1 (e.g., multi-functional apparatus) can be implemented or devised, for example, by a computer having a hardware configuration illustrated in FIG. 3. FIG. 3 is an example of a hardware block diagram of the output apparatus 10. As illustrated in FIG. 3, the output apparatus 10 includes, for example, a controller 601, an operation panel 602, an external I/F 603, a communication I/F 604, a printer 605, and a scanner 606.

As illustrated in FIG. 3, the controller 601 includes, for example, a CPU 611, a RAM 612, a ROM 613, a non-volatile RAM (NVRAM) 614, and a HDD 615. The ROM 613 stores various programs and/or data. The RAM 612 temporarily stores programs and/or data. The NVRAM 614 stores, for example, setting information or the like. Further, the HDD 615 stores various programs and/or data.

The CPU 611 reads the programs, data, and setting information from the ROM 613, the NVRAM 614, and/or the HDD 615 to the RAM 612, and executes the programs to implement controlling and functions of the output apparatus 10 as a whole.

The operation panel 602 includes, for example, an input unit to receive an input by a user, and a display to display information or data. The external I/F 603 is used as an interface with an external apparatus or device. The external apparatus or device includes, for example, a recording medium 603a. With this configuration, the output apparatus 10 can read and write data with the recording medium 603a via the external I/F 603. The recording medium 603a includes, for example, an integrated circuit (IC) card, a flexible disk, a compact disk (CD), a digital versatile disk (DVD), a secure digital (SD) memory card, and a universal serial bus (USB), and a subscriber identity module (SIM) card.

The communication I/F 604 is used as an interface to connect the output apparatus 10 to the network 60 wirelessly or by wire, with which the output apparatus 10 can perform data communication via the communication I/F 604. The printer 605 is an example of a printing apparatus that prints print data on a medium. The medium includes, for example, paper, coated paper, cardboard, overhead projector (OHP) sheet, plastic film, prepreg, copper foil, and sheet, but not limited thereto. The scanner 606 is an example of a scanning apparatus that scans image data from document as electronic data. Further, in an example case of FIG. 3, the output apparatus 10 is a multi-functional apparatus. If the output apparatus 10 is not the multi-functional apparatus, the printer 605 and the scanner 606 can be omitted. Further, other hardware such as a camera, a light source, and a touch panel can be included.

(Software Configuration)
(Counter-Information Accumulation Server)

Figure 4:
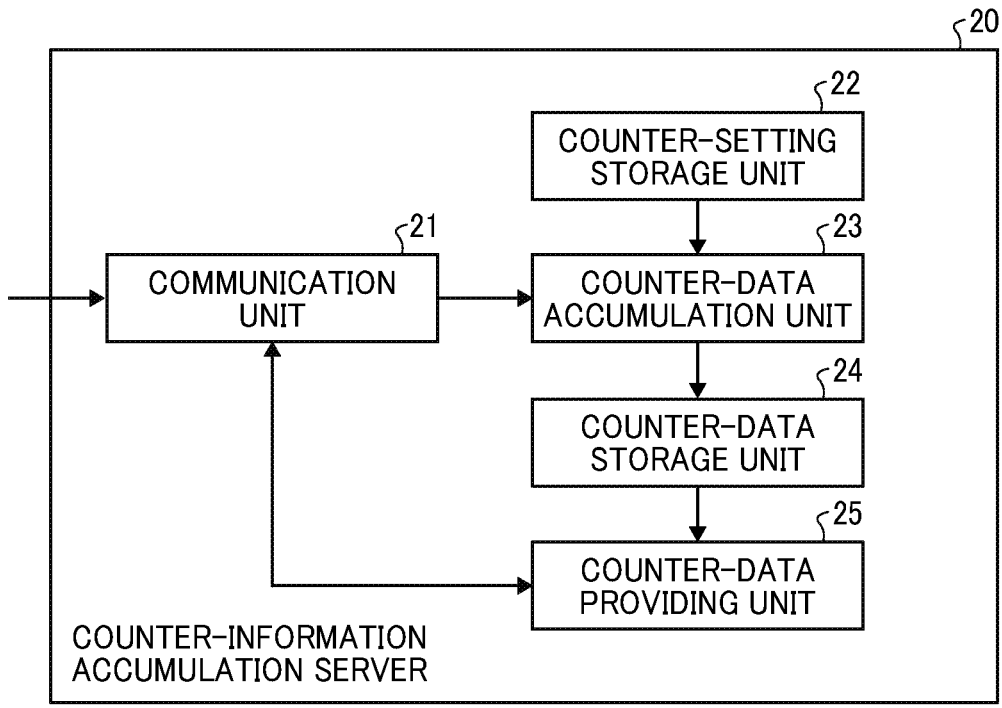
FIG. 4 is a functional block diagram of an example of a counter-information accumulation server.

In the embodiment, the counter-information accumulation server 20, implemented or devised by using the computer 500 (FIG. 2), performs processing by implementing functions, for example, illustrated in FIG. 4. FIG. 4 is an example of a functional block diagram of the counter-information accumulation server 20 of the embodiment. The counter-information accumulation server 20 executes one or more programs to implement the functions illustrated in FIG. 4.

As illustrated in FIG. 4, the counter-information accumulation server 20 includes functional units such as a communication unit 21, a counter-setting storage unit 22, a counter-data accumulation unit 23, a counter-data storage unit 24, and a counter-data providing unit 25. The communication unit 21 performs data communication with an external apparatus, device, or system.

The counter-setting storage unit 22 stores counter setting to be described later. The counter setting is information required to accumulate the count values by using the counter-data accumulation unit 23. The counter-data accumulation unit 23 stores daily data of each one of the output apparatuses 10 generated from the count values received by the communication unit 21, and the counter setting in the counter-data storage unit 24. The counter-data storage unit 24 stores the daily data of each one of the output apparatuses 10.

When the counter-data providing unit 25 receives a request from the analysis data accumulation server 30, the counter-data providing unit 25 provides the daily data of each one of the output apparatuses 10 stored in the counter-data storage unit 24 to the analysis data accumulation server 30 through the communication unit 21. Further, when the counter-data providing unit 25 receives a request from the Web server 40, the counter-data providing unit 25 provides the daily data stored in the counter-data storage unit 24 to the Web server 40 through the communication unit 21.

(Analysis Data Accumulation Server)

Figure 5:
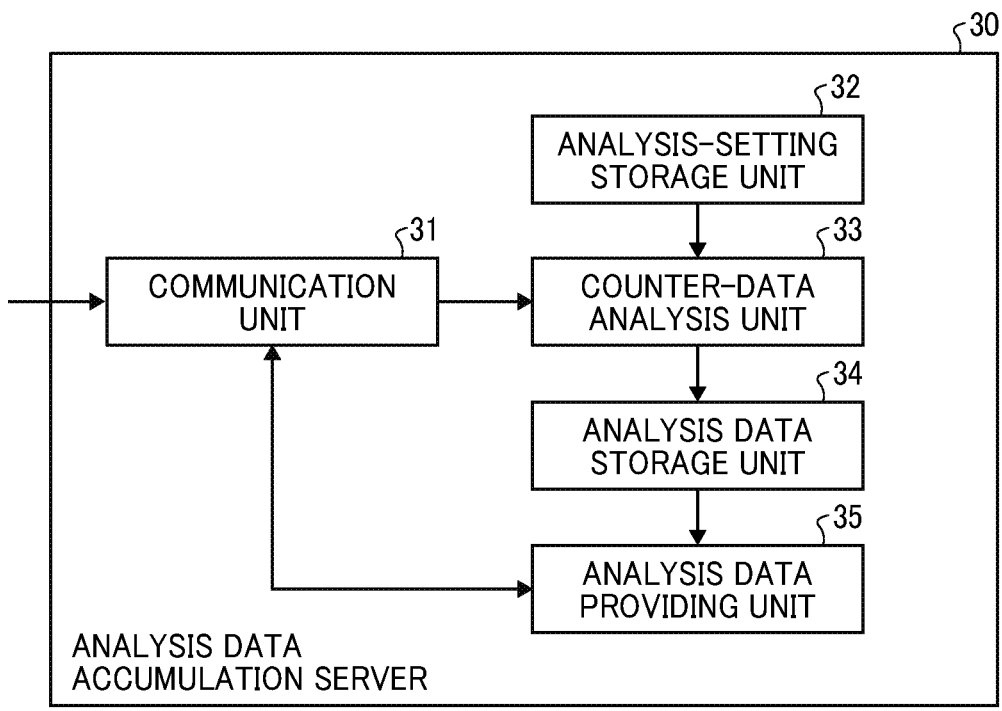
FIG. 5 is an example of a functional block diagram of an analysis data accumulation server.

In the embodiment, the analysis data accumulation server 30, implemented or devised by using the computer 500 (FIG. 2) performs processing by implementing functions, for example, illustrated in FIG. 5. FIG. 5 is an example of a functional block diagram of the analysis data accumulation server 30 of the embodiment. The analysis data accumulation server 30 executes one or more programs to implement the functions illustrated in FIG. 5.

As illustrated in FIG. 5, the analysis data accumulation server 30 includes functional units such as a communication unit 31, an analysis-setting storage unit 32, a counter-data analysis unit 33, an analysis data storage unit 34, and an analysis data providing unit 35. The communication unit 31 performs data communication with an external apparatus, device, or system.

The analysis-setting storage unit 32 stores analysis setting to be described later. The analysis-setting is information required to process the daily data to generate data suitable for analysis (e.g., monthly data of year/month, group, counter type) by the counter-data analysis unit 33, and to store the data suitable for analysis. The analysis setting includes, for example, group information, apparatus information, and apparatus history information to be described later.

Based on the daily data received via the communication unit 31 and the analysis setting received from the analysis-setting storage unit 32, the counter-data analysis unit 33 processes the daily data of each one of the output apparatuses 10 to generate the data suitable for analysis (hereinafter, analysis data) such as condition-specified monthly data suitable for analysis that can be generated for various conditions such as each year/month, each group, and each counter type, and stores the generated analysis data in the analysis data storage unit 34. Therefore, the analysis data storage unit 34 stores, for example, the condition-specified monthly data. Further, when the analysis data providing unit 35 receives a request from the Web server 40, the analysis data providing unit 35 provides the condition-specified monthly data, stored in the analysis data storage unit 34, to the Web server 40 through the communication unit 31.

(Web Server)

Figures 6, 7, 8:
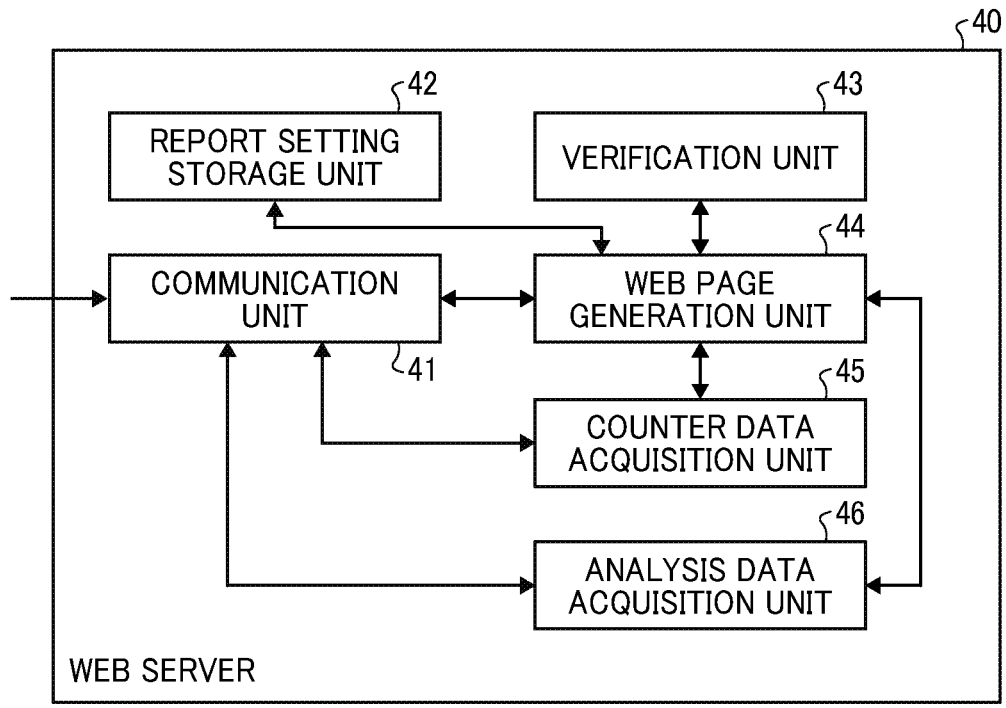
FIG. 6 is an example of a functional block diagram of a Web server.
FIG. 7 is an example of a configuration of counter setting.
FIG. 8 is an example of a configuration of daily data.

In the embodiment, the Web server 40, implemented or devised by using the computer 500 (FIG. 2), performs processing by implementing functions, for example, illustrated in FIG. 6. FIG. 6 is an example of a functional block diagram of the Web server 40 of the embodiment. The Web server 40 executes one or more programs to implement the functions illustrated in FIG. 6. As illustrated in FIG. 6, the Web server 40 includes functional units such as a communication unit 41, a report setting storage unit 42, a verification unit 43, a Web page generation unit 44, a counter data acquisition unit 45, and an analysis data acquisition unit 46. The communication unit 41 performs data communication with an external apparatus, device, or system.

The report setting storage unit 42 stores report setting to be described later. The report setting is information required to generate a Web page including daily data and condition-specified monthly data of the output apparatus 10 by the Web page generation unit 44. The report setting includes, for example, group hierarchy information and group relationship information to be described later.

The verification unit 43 performs verification of a user that operates the user terminal 12 or the vendor terminal 70. The user verification can be performed, for example, by determining whether verification information (e.g., combination of user ID and password) received through the communication unit 41 matches verification information registered in the Web server 40 in advance, but other verification method can be used. Further, the user verification information registered in advance can be registered in a database outside the Web server 40. When the communication unit 41 receives a request from the user terminal 12 or the vendor terminal 70, the Web page generation unit 44 generates a Web page based on the received request, and transmits the generated Web page to the user terminal 12 or the vendor terminal 70 through the communication unit 41 so that the Web page is displayed by the Web browser installed in the user terminal 12.

Further, when the Web page generation unit 44 needs the daily data and the condition-specified monthly data of the output apparatus 10 for generating the Web page, the Web page generation unit 44 requests to the counter data acquisition unit 45 and the analysis data acquisition unit 46 to acquire the needed data from the counter data acquisition unit 45 and the analysis data acquisition unit 46.

When the counter data acquisition unit 45 receives a request for the daily data of the output apparatus 10 from the Web page generation unit 44, the counter data acquisition unit 45 acquires the daily data of the output apparatus 10 by receiving the daily data of the output apparatus 10 from the counter-information accumulation server 20 through the communication unit 41, and then the counter data acquisition unit 45 provides the daily data of the output apparatus 10 to the Web page generation unit 44. Further, when the analysis data acquisition unit 46 receives a request for the condition-specified monthly data from the Web page generation unit 44, the analysis data acquisition unit 46 acquires the condition-specified monthly data by receiving the condition-specified monthly data from the analysis data accumulation server 30 through the communication unit 41, and then the analysis data acquisition unit 46 provides the condition-specified monthly data to the Web page generation unit 44.

(Counter Setting)

FIG. 7 is an example of a configuration of the counter setting. As illustrated in FIG. 7, the counter setting includes information items such as apparatus ID, media access control (MAC) address, and daily data ID. The apparatus ID is an example of identification information used for uniquely identifying each one of the output apparatuses 10. The MAC address is an example of identification information used for uniquely identifying each one of the output apparatuses 10 on a communication network. The daily data ID is an example of identification information used for uniquely identifying each one of the daily data of each one of the output apparatuses 10 identified by the apparatus ID and/or the MAC address. Further, the apparatus ID can include information such as internet protocol (IP) address, MAC address, and serial number. The apparatus ID can further include an ID number, stored or recorded in a recording medium connected to the output apparatus 10 wirelessly or by wire.

FIG. 8 is an example of a configuration of the daily data. As illustrated in FIG. 8, the daily data includes information items such as daily data ID, date (e.g., year, month, day), and various count values. The daily data ID is an example of identification information used for uniquely identifying each one of the daily data. The date (e.g., year, month, day) indicates a specific day when the various count values of the daily data were counted. The various count values indicate daily count values including different types of count values such as a total value of count values, count values for each of functions, count values for each of colors (e.g., full color, monochrome), and count values for each of different sheet size of the output apparatus 10.

FIG. 9 is an example of a configuration of the group information. As illustrated in FIG. 9, the group information includes information items such as group identification (ID), group name, address, telephone number, e-mail address, and closing date. The group ID is an example of identification information used for uniquely identifying each one of groups. The group indicates a unit such as a company, an association, a department, and a section and the like. The group name is a name of the group identified by the group ID. The address, telephone number, e-mail address, and closing date correspond to the address, telephone number, e-mail address, and closing date of the group identified by the group ID. Further, the closing date is used as a reference date for generating the monthly data from the daily data. The e-mail address can be registered with an e-mail address of a user belonging to the group and/or an e-mail address of an administrator belonging to the group.

FIG. 10 is an example of a configuration of the apparatus information. As illustrated in FIG. 10, the apparatus information includes information items such as apparatus ID, group ID, MAC address, daily data ID, and monthly data ID. Since the apparatus information links or associates the apparatus ID, the group ID, and the MAC address one another, a specific group is linked or associated with a specific output apparatus used by the specific group.

Further, since the apparatus information links or associates the group ID, the daily data ID, and the monthly data ID, the specific group is linked or associated with the daily data and the monthly data related to the specific group. Further, since the apparatus information links or associates the apparatus ID and the MAC address to the daily data ID and the monthly data ID, the specific output apparatus is linked or associated with the daily data and the monthly data related to the specific output apparatus.

FIG. 11 is an example of a configuration of the apparatus history information. As illustrated in FIG. 11, the apparatus history information includes information items such as apparatus ID, updated date, and group ID. The apparatus history information indicates one or more groups where the output apparatus 10 identified by the apparatus ID was and is used (e.g., placed) along the time line (i.e., transfer history information of the output apparatus 10 among the groups). For example, when the output apparatus 10 was and is used (e.g., placed) in a plurality of groups along the time line, the apparatus history information indicates a transfer history of the output apparatus 10 among the plurality of groups where the output apparatus 10 was and is placed, in which the apparatus history information indicates that the one output apparatus 10 was possessed by one group during one time period, and the same one output apparatus 10 is possessed by another group during another time period. The updated date indicates a specific date when the output apparatuses 10 is transferred from one group to another group. When the analysis data accumulation server 30 extracts one or more records from the apparatus history information (FIG. 11) by using the apparatus ID as a key, the analysis data accumulation server 30 can determine a group ID of each of the groups where the output apparatus 10 was placed or is placed, and a placement period when the output apparatus 10 was placed or is being placed in each of the groups.

FIG. 12 is an example of a configuration of the monthly data. As illustrated in FIG. 12, the monthly data includes information items such as monthly data ID, year/month as date information indicating a specific year and a specific month, and various count values. The monthly data ID is an example of identification information used for uniquely identifying each one of the monthly data. The year/month indicates a specific month in a specific year when the various count values of the monthly data were counted. The various count values indicate monthly count values including different types of count value such as a total value of count values, count values for each of functions, count values for each of colors (e.g., full color, monochrome), and count values for each of different sheet size-of the output apparatus 10.

Figures 13, 14, 15:
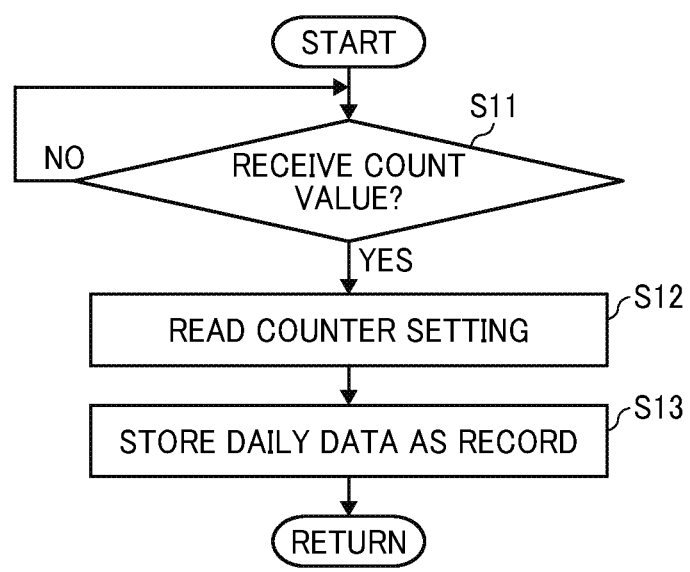
FIG. 13 is an example of a configuration of group hierarchy information.
FIG. 14 is an example of a configuration of group relationship information.
FIG. 15 is an example of a flow chart illustrating the steps of accumulating counter-information.

FIG. 13 is an example of a configuration of the group hierarchy information. The group hierarchy information indicates a hierarchical relationship between groups, and the group hierarchy information includes information items such as group ID, parent ID, and company ID. The parent ID identifies a parent group that is at the top of another one or more groups identified by one or more group IDs, in which the parent group is higher than another one or more groups, for example, for one level in the hierarchy among the groups. The company ID identifies a company that the groups identified by the group IDs and the parent group identified by the parent ID belong to. The group hierarchy information of FIG. 13 indicates a hierarchical relationship between the groups in the company composed of a plurality of groups. Further, the parent ID can be used to link or associates a parent company and a subsidiary. For example, when the subsidiary is set with one group ID, and a parent company is set with the parent ID, the parent company and the subsidiary can be linked or associated with each other based on the group ID and the parent ID. Further, when one or more groups is included in the subsidiary, a group ID is set for each of the one or more groups included in the subsidiary, and then the group IDs of the one or more groups included in the subsidiary can be linked or associated with the subsidiary, and managed.

FIG. 14 is an example of a configuration of group relationship information. The group relationship information indicates a relationship between one or more groups in a user system that receive services from the vendor, and one or more vendors that provide services to the user system. The group relationship information includes information items such as group ID and vendor ID. The group ID is used to identify an organization such as an enterprise, a company, a group, an educational institution, a government agency and a department that uses the services provided by the vendor. Further, the vendor ID is an example of identification information used for uniquely identifying the vendor that provides services to a group identified by a group ID.

The group relationship information of FIG. 14 links or associates a group such as an enterprise, a company, a group, and a department identified by the group ID, and the vendor. Therefore, when the group relationship information of FIG. 14 is set with various patterns, one vendor can be linked or associated with one company, and another vendor (different vendor) can be linked or associated with one department in the one company, in which different vendors are linked or associated with different groups.

(Processing)
(Accumulation of Counter-Information)

In the embodiment, the counter-information accumulation server 20 of the information processing system 1 performs a counter-information accumulation process, for example, based on a sequence illustrated in FIG. 15. FIG. 15 is an example of a flow chart illustrating the steps of accumulating counter-information.

In the counter-information accumulation server 20, the counter-data accumulation unit 23 waits to receive a count value linked or associated with the apparatus ID or the MAC address from the output apparatus 10 or the intermediary apparatus 14 disposed in the user system US at step S11. When the counter-data accumulation unit 23 receives the count value linked or associated with the apparatus ID or the MAC address (step S11: YES), at step S12, the counter-data accumulation unit 23 reads out a record of the counter setting (FIG. 7) from the counter-setting storage unit 22 by using the apparatus ID or the MAC address as a key.

At step S13, the counter-data accumulation unit 23 adds a daily data ID to the count value received at step S11 to generate a daily data record based on the counter setting read at step S12, and stores the generated daily data record in the counter-data storage unit 24.

(Analysis of Counter-Information)

Figure 16:
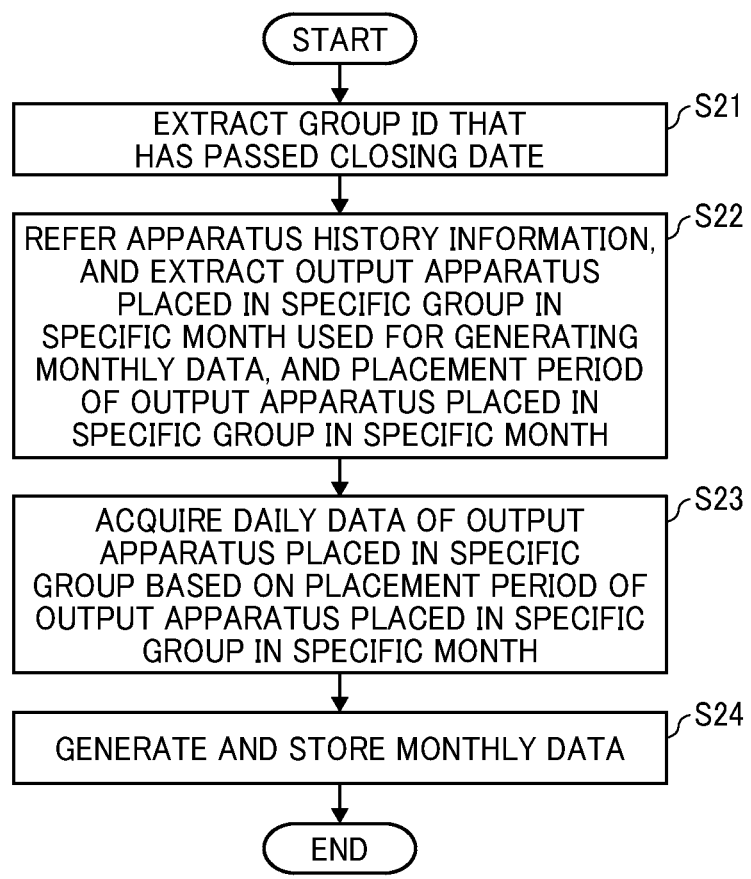
FIG. 16 is an example of a flow chart illustrating the steps of analyzing counter-information.

In the embodiment, the analysis data accumulation server 30 disposed in the information processing system 1 performs, for example, a sequence illustrated in FIG. 16 to analyze counter information. FIG. 16 is an example of a flow chart illustrating the steps of analyzing the counter information.

At step S21, the counter-data analysis unit 33 of the analysis data accumulation server 30 refers the group information (FIG. 9) included in the analysis setting to determine a group ID identifying a specific group that has passed the closing date based on a current date and the closing date included in the group information (FIG. 9), and extracts the group ID identifying the specific group that has passed the closing date. Then, the monthly data of the specific group identified by the extracted group ID is to be generated in step S22 and subsequent steps.

At step S22, the counter-data analysis unit 33 refers the updated date and the group ID in the apparatus history information (FIG. 11), and extracts the apparatus ID of the output apparatus 10 that was or is placed in the specific group identified by the group ID extracted at step S21, and the placement period of the output apparatus 10 during an operation information generation period such as a specific one-month period used for generating monthly data. At step S22, for example, when one output apparatus 10 was used in a first group, and then the one output apparatus 10 was transferred and placed in the second group during the operation information generation period, a first placement period of the output apparatus 10 when the output apparatus 10 was placed in the first group and a second placement period of the output apparatus 10 when the output apparatus 10 was placed in the second group can be determined based on the updated date of the output apparatus 10 in the operation information generation period. In this description, the operation information generation period corresponds to an operation monitoring period used for monitoring operation status of the output apparatus 10 used among a plurality of groups, in which the secondary data such as the monthly data can be used as operation monitoring information or operation status information for monitoring the operation status of the output apparatus 10 used among the plurality of groups in the operation monitoring period.

At step S23, based on the placement period that the output apparatus 10 was placed or is placed in the specific group, the counter-data analysis unit 33 requests the daily data of the output apparatus 10 that was placed or is placed in the specific group to the counter-information accumulation server 20 to acquire the daily data of the output apparatus 10 that was placed or is placed in the specific group. Specifically, the counter-data analysis unit 33 transmits the apparatus ID of the output apparatus 10 extracted at step S22, and a request for the daily data counted during the placement period extracted at step S22 to the counter-information accumulation server 20 through the communication unit 31. When the communication unit 21 receives the request, the counter-information accumulation server 20 uses the counter-data providing unit 25 to transmit the daily data of each one of the output apparatuses 10, stored in the counter-data storage unit 24, to the communication unit 31 of the analysis data accumulation server 30. Then, at step S24, the counter-data analysis unit 33 generates the monthly data (FIG. 12) from the daily data acquired from the counter-information accumulation server 20, and stores the generated monthly data in the analysis data storage unit 34.

Further, in the sequence of FIG. 16, the monthly data is generated from the daily data when the current date has passed through the closing date of the group, but not limited thereto. For example, at a timing when the Web server 40 requests the monthly data to the counter-data analysis unit 33, the counter-data analysis unit 33 can generate the monthly data from the daily data. Further, the counter-data analysis unit 33 can generate weekly count value, and/or yearly count value respectively as weekly data, quarterly data, and/or yearly data instead of the monthly data or with the monthly data as examples of the secondary data.

At step S24, the counter-data analysis unit 33 generates, for example, the condition-specified monthly data suitable for analysis that can be generated for various conditions such as each of year/month, each of groups, and each of counter types from the acquired daily data as an OLAP cube 1001 illustrated in FIG. 17. FIG. 17 is an example of a configuration of the OLAP cube of the embodiment.

Figures 17A, 17B:
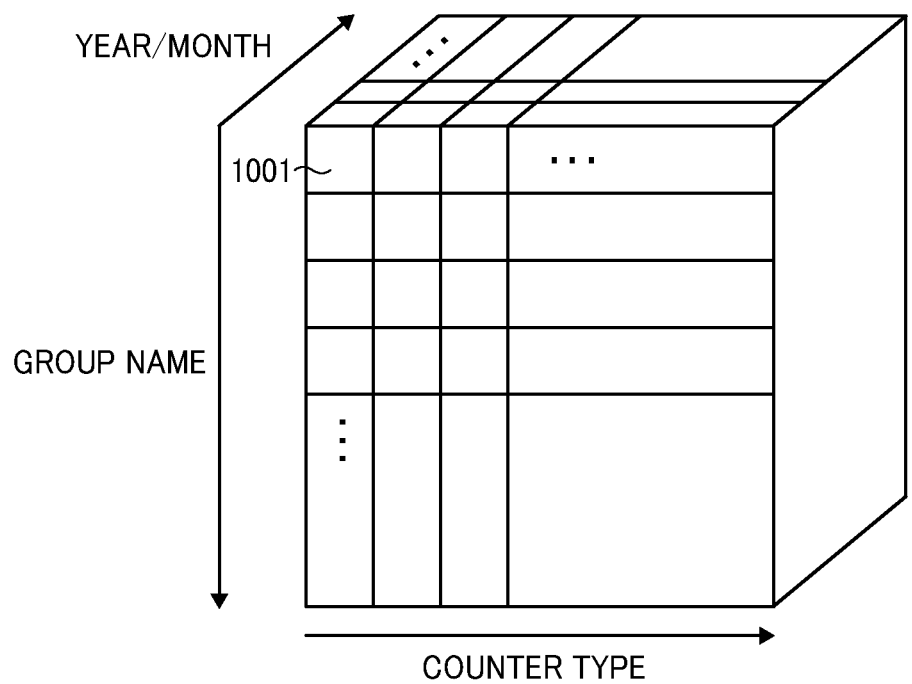
FIGS. 17A and 17B are an example of a diagram of an OLAP cube.

FIG. 17 is an example of a configuration of the monthly data of the OLAP cube 1001 generated from the acquired daily data. As illustrated in FIG. 17A, the OLAP cube 1001 can be configured by a plurality of information items such as group name, year/month, apparatus, and counter type, and count value. As to the OLAP cube 1001 of FIG. 17A, data can be configured, for example, as illustrated in FIG. 17B, in which the count value can be analyzed for each of year/month, each of group name, and each of counter type. As to the data configuration of FIG. 17B each time the current date has passed the closing date of the group, the OLAP cube 1001 is added along the time axis direction such as the year/month. For example, in a case of acquiring the monthly data linked or associated with the designated group and year/month, when the group ID and year/month can be identified, the group name can be identified from the group information (FIG. 9), and then the monthly data linked or associated with the identified group name and designated year/month can be extracted and acquired from the OLAP cube 1001. Further, instead of the group name, the group ID can be set as the information item for extracting and acquiring data from the OLAP cube 1001.

Further, although the OLAP cube 1001 is used as one example of data configuration of database, other database having other data configuration can be used for managing the data.

(Display of Web Page)

In the embodiment, the information processing system 1 performs, for example, a sequence illustrated in FIG. 18 to display a Web page. FIG. 18 is an example of a sequential chart of displaying the Web page.

At step S31, a user such as an administrator of the user system US operates the user terminal 12 to transmit a login request to the Web server 40. The Web server 40 stores user identification (ID) and the group ID of the group where the user belongs as user information by associating the user ID and the group ID with each other. At step S32, the verification unit 43 of the Web server 40 performs the verification of the user that has requested the login based on the user verification information included in the login request received through the communication unit 41. FIG. 18 illustrates an example case that the user verification is verified successfully. Further, when the user verification is failed, step S33 and the subsequent steps are not performed.

When the user has succeeded the login verification at step S32, at step S33, the Web server 40 determines an access right for the service user that has succeeded the login verification to be described later. In a case of FIG. 18, when the service user such as an administrator of the user system US has succeeded the login verification, the Web server 40 determines that the service user has an access right to daily data and monthly data of the output apparatus 10 linked or associated with the company that the service user belongs to. Further, when the company that the service user belongs is linked or associated with a subsidiary, the Web server 40 determines that the service user has the access right to the daily data and monthly data of the output apparatus 10 linked or associated with the subsidiary.

Further, a vendor person operates the vendor terminal 70 at step S31 to transmit a login request to the Web server 40, in which the sequence of FIG. 18 is performed by the vendor person having the vendor terminal 70, and the vendor person is a user. When the vendor person that operates the vendor terminal 70 has succeeded the login verification at step S32, the Web server 40 determines that the vendor person has an access right to the daily data and the condition-specified monthly data of the output apparatus 10 placed in a group (e.g., company, department) linked or associated with the vendor.

At step S34, the analysis data acquisition unit 46 of the Web server 40 identifies the group ID linked or associated with the user ID of the user that has succeeded the login verification, and acquires the monthly data linked or associated with the identified group ID from the analysis data accumulation server 30.

At step S35, the Web page generation unit 44 of the Web server 40 generates screen image data of a top page 1100, to-be-described later in FIG. 19, based on the monthly data acquired or received from the analysis data accumulation server 30. At step S36, the Web server 40 transmits the screen image data of the top page 1100 to the user terminal 12 through the communication unit 41. At step S37, when the user terminal 12 receives the screen image data of the top page 1100, the Web browser displays, for example, the top page 1100 illustrated in FIG. 18 on the user terminal 12. Further, another top page similar to the top page 1100 illustrated in FIG. 18 can be displayed on the vendor terminal 70 when the sequence of FIG. 18 is performed by the vendor person having the vendor terminal 70.

Figure 19:
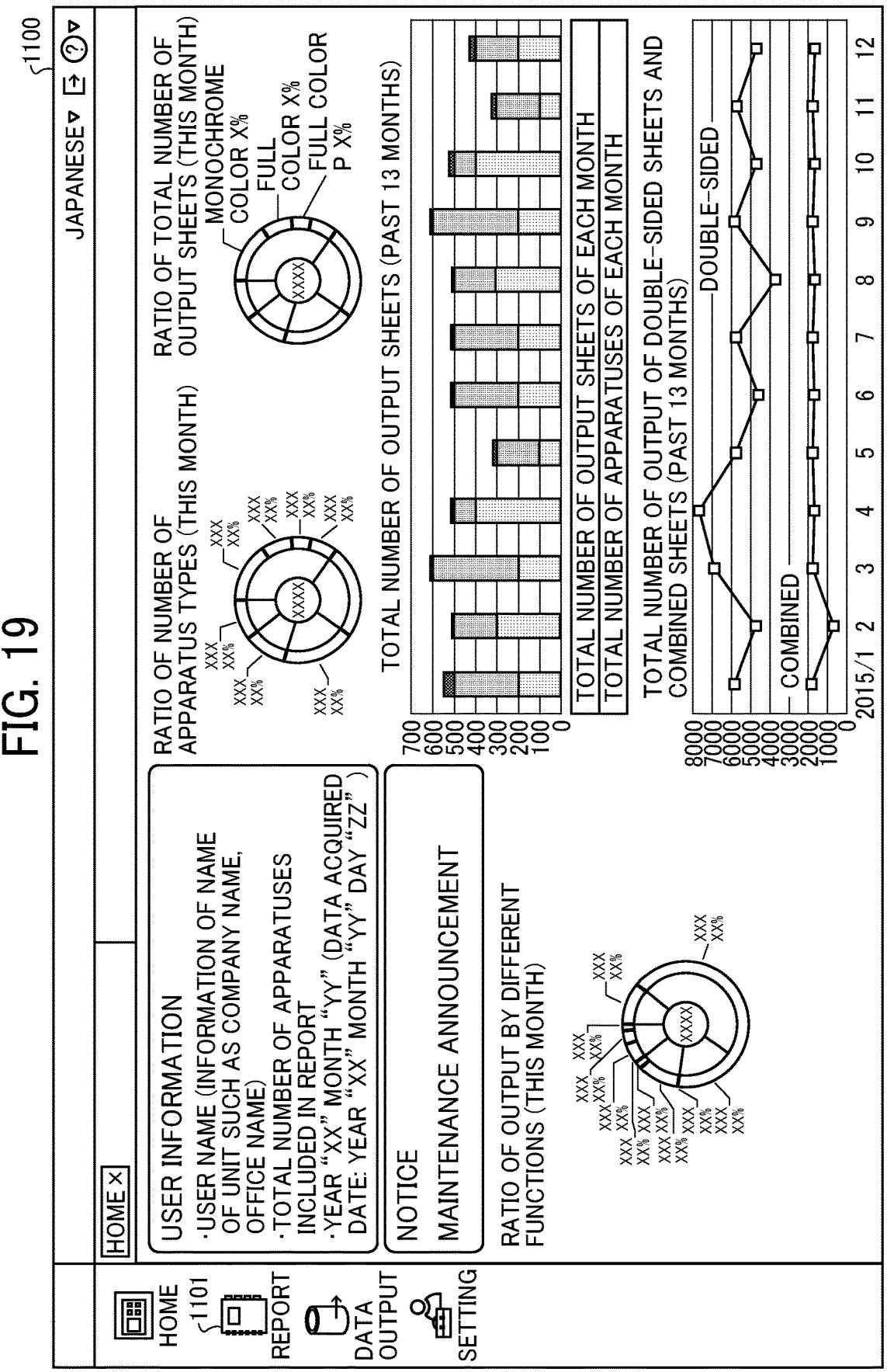
FIG. 19 is an example of a screen image of a top page.

FIG. 19 is an example of a screen image of the top page 1100. When a user presses a report button 1101 on the top page 1100, an analysis condition selection screen used for selecting the analysis condition of the monthly data can be displayed. In this configuration, conditions that can be selected on the analysis condition selection screen is defined by the access right determined at step S33. When the user selects the analysis condition such as the group ID and the apparatus ID on the analysis condition selection screen, the Web browser displays the monthly data for each of the selected conditions on the user terminal 12.

For example, the monthly data for each one of the groups displayed on the user terminal 12 by the Web browser can be generated based on a transfer history or transfer status of the output apparatus 10 between the groups. For example, as above described, the output apparatus 10 can be transferred from one group to a selected group, and the output apparatus 10 can be transferred from the selected group to another group.

Figure 20:
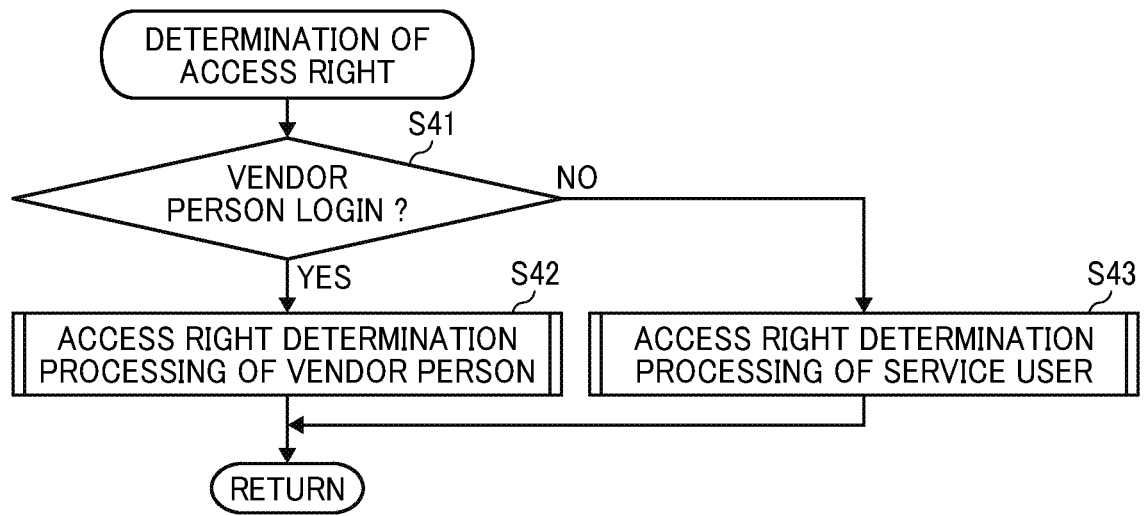
FIG. 20 is an example of a flow chart illustrating the steps of determining an access right of a user.

Hereinafter, a description is given of a process of determining the access right performed at step S33 with reference to FIG. 20. FIG. 20 is an example of a flow chart illustrating the steps of determining the access right of a user. At step S41, the Web page generation unit 44 of the Web server 40 determines whether a user that has succeeded the login verification at step S32 (FIG. 32) is a vendor person or not.

The Web server 40 can store and manage a user ID registered for a vendor person of a vendor separately from a user ID registered for a service user of a service-use company to determine whether a person or user that has succeeded the login verification is the vendor person. In this configuration, the Web server 40 determines whether a user ID of a user that that has succeeded the login verification matches a user ID registered for the vendor person in the Web server 40 to determine whether the user that that has succeeded the login verification is the vendor person. Further, the Web server 40 can associate information indicating the vendor person (e.g., attribute information of vendor person) with the user ID in advance and store, and then determine whether the user that has succeeded the login verification is the vendor person based on the attribute information.

In this description, the vendor is an example of a group that provides services, but the group that provide services is not limited to the vendor but can be other organization. Further, the service-use company is an example of a group that receives services, but the group that receives services is not limited to the company but can be other organization composed of given units. In this description, the vendor is one or more persons or one or more companies (i.e., seller companies) that sell one or more apparatuses to one or more service-use companies, and the one or more seller companies may manufacture and sell one or more apparatuses to one or more service-use companies, or the one or more seller companies may only sell one or more apparatuses, purchased from other companies, to one or more service-use companies. The vendor can be also referred to as broker, dealer, and merchandiser.

When the user that has succeeded the login verification is the vendor person, at step S42, the Web page generation unit 44 performs the access right determination processing of the vendor person to be described later. When the user that has succeeded the login verification is not the vendor person but is a service user of the service-use company, at step S43, the Web page generation unit 44 performs the access right determination processing of the service user of the service-use company to be described later.

Figure 21:
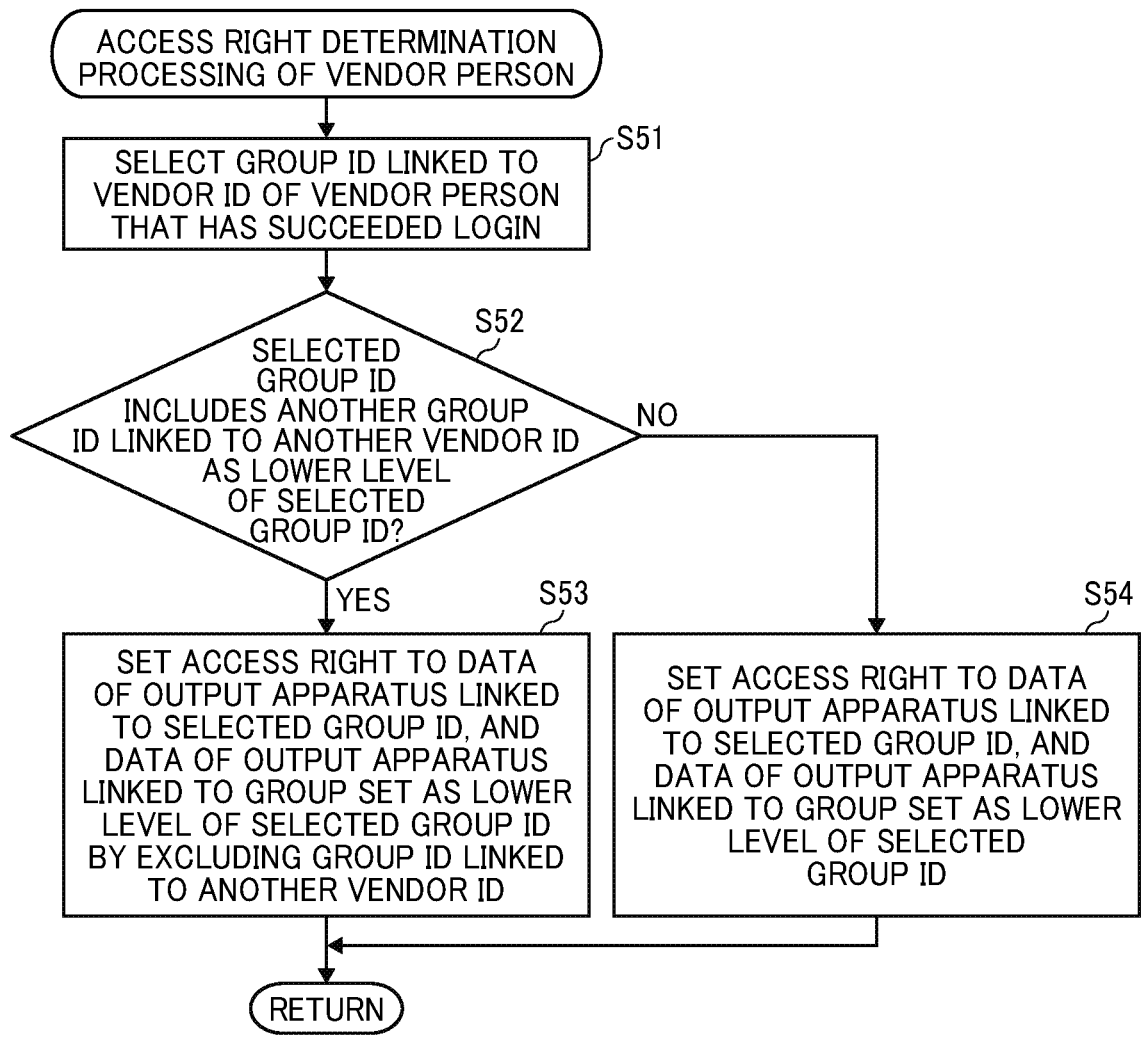
FIG. 21 is an example of a flow chart illustrating the steps of determining an access right of a vendor person.

FIG. 21 is an example of a flow chart illustrating the steps of a process of determining the access right of the vendor person. At step S51, the Web page generation unit 44 refers the group relationship information (FIG. 14), and selects a group ID of the service-use company linked or associated with one vendor ID of a first vendor that has succeeded the login verification at step S41 (FIG. 20).

At step S52, the Web page generation unit 44 determines whether the group ID of the service-use company selected at step S51 is linked or associated with another group ID of the service-use company linked or associated with another vendor ID of a second vendor, in which another group ID of the service-use company is set at a lower level compared to the group ID of the service-use company selected at step S51.

When the group ID of the service-use company selected at step S51 is linked or associated with another group ID of the service-use company that is set as a lower level group compared to the group ID selected at step S51, and another group ID of the service-use company is linked or associated with another vendor ID of the second vendor (S52: YES), the Web page generation unit 44 proceeds to step S53. At step S53, the Web page generation unit 44 sets an access right of a vendor person of the first vendor to daily data and monthly data of the output apparatus 10 linked or associated with the group ID of the service-use company selected at step S51, and daily data and monthly data of the output apparatus 10 linked or associated with one or more group IDs set as the lower level group of the group ID of the service-use company selected at step S51 by excluding an access right to the another group ID of the service-use company linked or associated with another vendor ID of the second vendor.

By contrast, when the group ID of the service-use company selected at step S51 is not linked or associated with another group ID of the service-use company set as the lower level group, and thereby another group ID of the service-use company linked or associated with another vendor ID of the second vendor does not exist (S52: NO), the Web page generation unit 44 proceeds to step S54. At step S54, the Web page generation unit 44 sets an access right of the vendor person of the first vendor to daily data and monthly data of the output apparatus 10 linked or associated with the group ID selected at step S51, and daily data and monthly data of the output apparatus 10 linked or associated with one or more group IDs set as a lower level group of the group ID selected at step S51.

Figure 22:
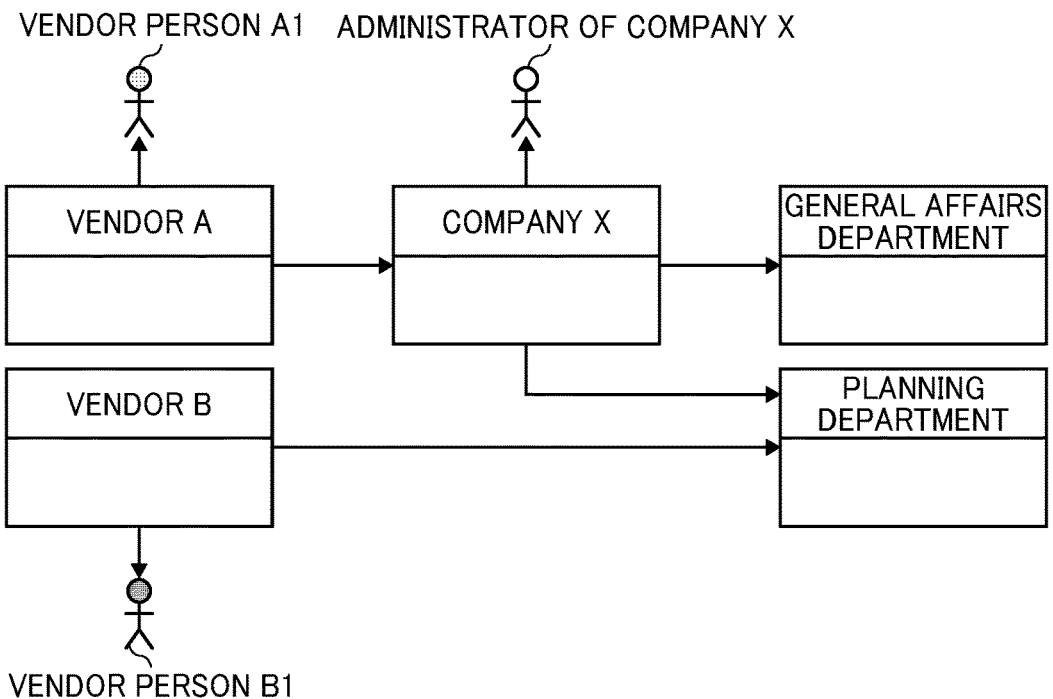
FIG. 22 is an example of a schematic diagram illustrating access right determination processing of a vendor person.

FIG. 22 is an example of a schematic diagram illustrating the access right determination processing of the vendor person. In an example case of FIG. 22, a vendor A (first vendor) is linked or associated with a "company X (first service-use company)" including departments such as "General Affairs Department" and "Planning Department," in which the "company X" is an example of the service-use company. In an example case of FIG. 22, the "vendor A (first vendor)" is linked or associated with the "company X (first service-use company)" while a vendor B (second vendor)" is linked or associated with "Planning Department," which is one of departments of the "company X (first service-use company)."

In this example case, when a "vendor person A1" of the "vendor A (first vendor)" has succeeded the login verification in the vendor person access right determination processing of FIG. 21, at step S51, a group ID of the "company X (first service-use company)" is selected. At step S52, the Web page generation unit 44 determines that the "company X (first service-use company)" has a "Planning Department" that is set as a lower group of the "company X (first service-use company)" and linked or associated with the "vendor B (second vendor)". Then, the Web page generation unit 44 sets an access right of the "vendor person A1" of the "vendor A (first vendor)" to daily data and monthly data of the output apparatus 10 linked or associated with the group ID of the "company X" and to daily data and monthly data of the output apparatus 10 linked or associated with the group ID of "General Affairs Department" of the "company X (first service-use company)."

By contrast, when a "vendor person B1" of the "vendor B (second vendor)" has succeeded the login verification in the vendor person access right determination processing of FIG. 21, at step S51, a group ID of "Planning Department" is selected. At step S52, the Web page generation unit 44 determines that no groups exists under the "Planning Department" and the no groups is linked or associated with another vendor. Then, the Web page generation unit 44 sets an access right of the "vendor person B1" the "vendor B (second vendor)" to daily data and monthly data of the output apparatus 10 linked or associated with the group ID of "Planning Department" selected at step S51.

As above described, when a plurality of vendors such as the first and second vendors is linked or associated with one group, a vendor linked or associated with the one group directly has a priority of access right to the one group. In this example case, the "vendor B (second vendor)" linked or associated with the "Planning Department" directly has a priority of access right.

Figure 23:
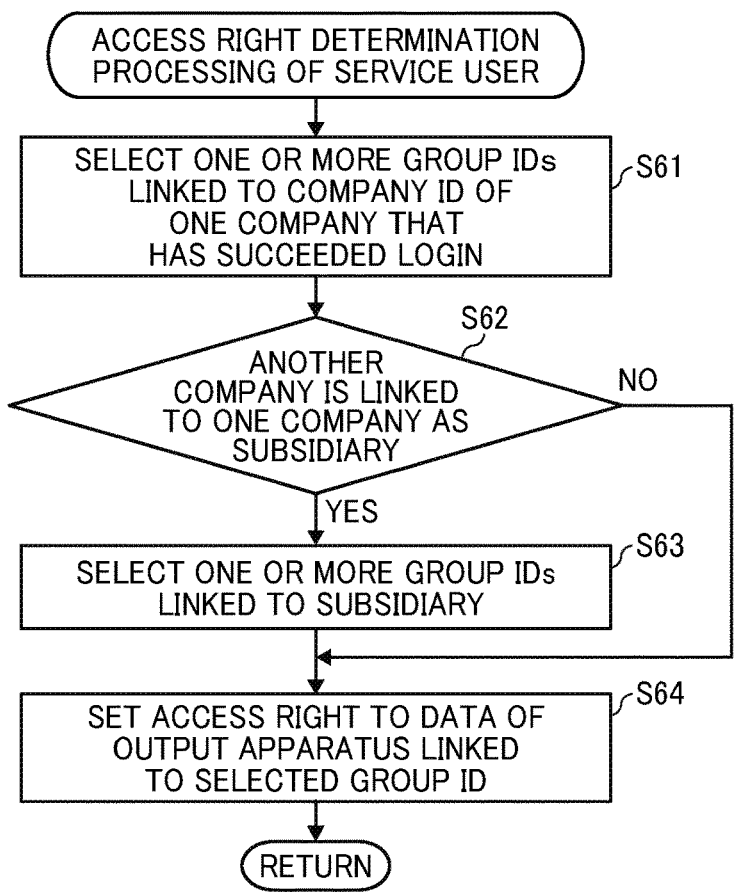
FIG. 23 is an example of a flow chart illustrating the steps of determining an access right of a service user of a service-use company.

FIG. 23 is an example of a flow chart illustrating the steps of the access right determination processing of a service user in a service-use company. At step S61, the Web page generation unit 44 refers the group hierarchy information (FIG. 13) and selects one or more group IDs linked or associated with a company ID of the service user company where the service user that has succeeded the login verification belongs to.

At step S62, the Web page generation unit 44 determines whether another company (second company) is linked or associated with the service-use company (first company) as a subsidiary. When another company is linked or associated with the one service-use company where the service user that has succeeded the login verification belongs to, as the subsidiary (S62: YES), the Web page generation unit 44 proceeds to step S63. At step S63, the Web page generation unit 44 selects one or more group IDs linked or associated with another company that is the subsidiary of the service-use company, and the sequence proceeds to step S64. By contrast, when another company is not linked or associated with the one service-user company where the service user that has succeeded the login verification belongs to, as the subsidiary (step S62: NO), the Web page generation unit 44 does not perform step S63, and the sequence proceeds to step S64.

At step S64, when another company is linked or associated with the service-user company where the service user that has succeeded the login verification belongs to, as the subsidiary (step S62: YES), the Web page generation unit 44 sets an access right of the service user to daily data and monthly data of the output apparatus 10 linked or associated with the one or more group IDs selected at step S61 and step S63. By contrast, when another company is not linked or associated with the service-use company where the service user that has succeeded the login verification belongs to, as the subsidiary (step S62: NO), the Web page generation unit 44 sets an access right of the service user to daily data and monthly data of the output apparatus 10 linked or associated with the one or more group IDs selected at step S61.

Figure 24:
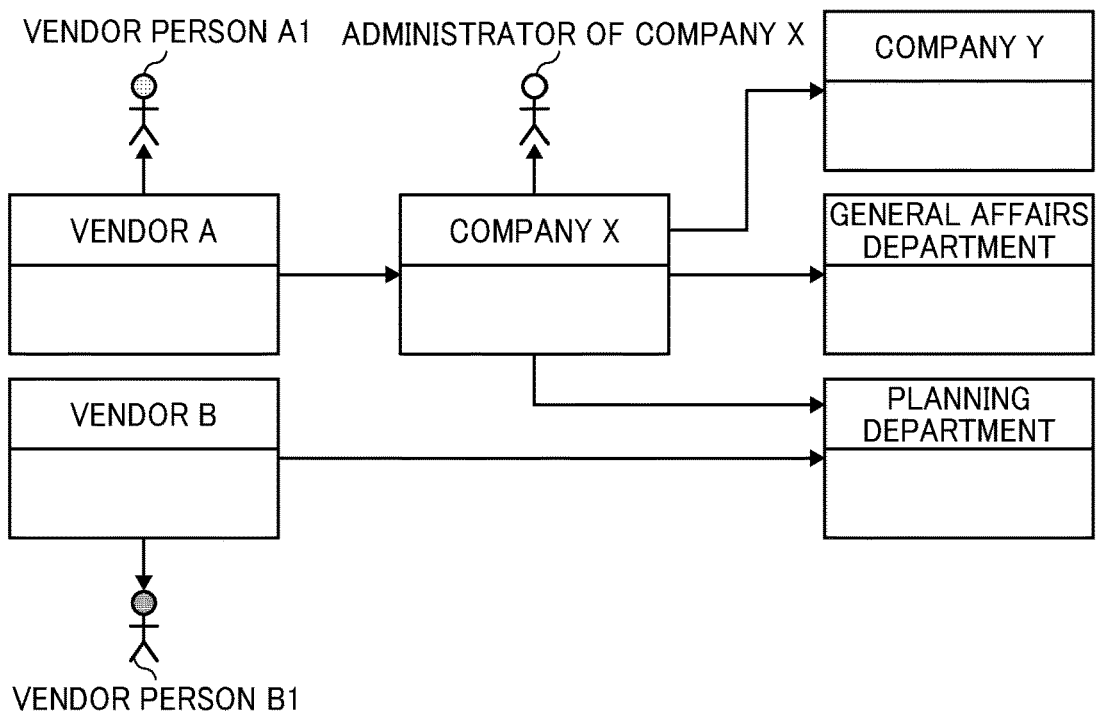
FIG. 24 is an example of a schematic diagram illustrating access right determination processing of a service user of a service-use company.

FIG. 24 is an example of a schematic diagram illustrating the access right determination processing of a service user of a service-use company. FIG. 24 is an example case that a "company Y (second company)" is linked or associated with a "company X (first company)" as a subsidiary. In this example case, when an administrator of the "company X" has succeeded the login verification in the access right determination processing of the service user of the service-use company of FIG. 23, at step S61, a group ID of "company X," a group ID of "General Affairs Department," and a group ID of "Planning Department" are selected.

In this example case, at step S62, the Web page generation unit 44 determines that the "company Y (second company)" is linked or associated with the "company X (first company)" as the subsidiary. Therefore, the Web page generation unit 44 sets an access right of the administrator of the "company X (first company)" to daily data and monthly data of the output apparatus 10 linked or associated with the group ID of the "company X (first company)," daily data and monthly data of the output apparatus 10 linked or associated with the group ID of the "General Affairs Department," daily data and monthly data of the output apparatus 10 linked or associated with the group ID of the "Planning Department," and daily data and monthly data of the output apparatus 10 linked or associated with the group ID of the "company Y (second company)."

By contrast, when an administrator of the "company Y (second company)" has succeeded the login verification in the access right determination processing of the service user of the service-use company of FIG. 23, another company is not linked or associated with the "company Y (second company)" as a subsidiary. Therefore, the Web page generation unit 44 sets an access right of the administrator of the "company Y (second company)" to the daily data and monthly data of the output apparatus 10 linked or associated with the group ID of the "company Y (second company)." As above described, when another company (second company) is linked or associated with a parent company (first company) as a subsidiary, an administrator of the parent company has the access right to one or more groups in the subsidiary.

Figure 25:
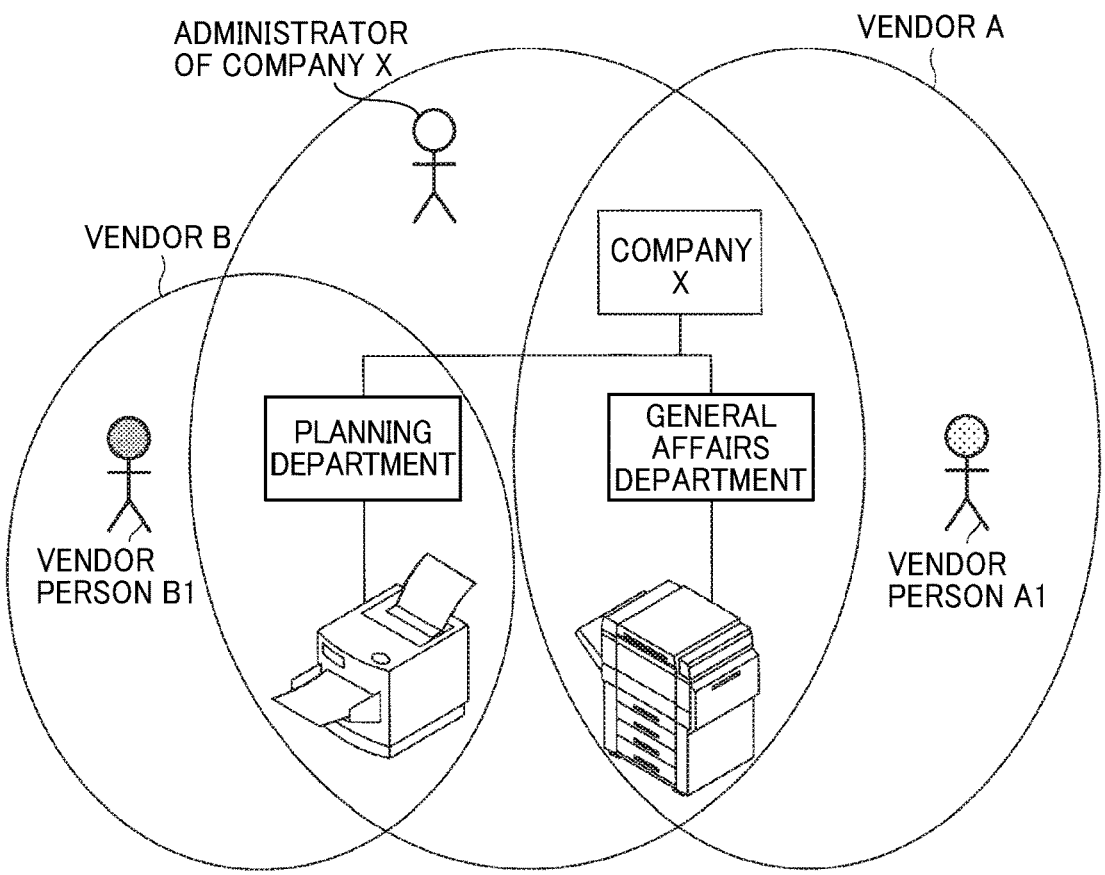
FIG. 25 is an example of a schematic diagram illustrating access rights set for different users.

FIG. 25 is an example of a schematic diagram illustrating access rights set for different users. As illustrated in FIG. 25, an administrator of a "company X (first company)" has an access right to daily data and monthly data of the output apparatus 10 linked or associated with a group ID of "company X," daily data and monthly data of the output apparatus 10 linked or associated with a group ID of "General Affairs Department" of the "company X," and daily data and monthly data of the output apparatus 10 linked or associated with a group ID of "Planning Department" of the "company X." Further, a vendor person B1 of a "vendor B (second vendor)" has an access right to the daily data of the output apparatus 10 and monthly data linked or associated with the group ID of the "Planning Department" of the "company X." Further, a vendor person A1 of "vendor A (first vendor)" has an access right to daily data and monthly data of the output apparatus 10 linked or associated with the group ID of the "company X" and daily data and monthly data of the output apparatus 10 linked or associated with the group ID of "General Affairs Department" of the "company X" while the vendor person A1 of "vendor A (first vendor)" has no access right to "Planning Department" linked or associated with the "vendor B (second vendor)."

(Configuration of Information Processing System)

As to the above described information processing system 1 of FIG. 1, the counter-information accumulation server 20, the analysis data accumulation server 30, and the Web server 40 are connected to the network 50 such as the Internet outside the user system US wirelessly or by wire, which means the information processing system 1 of FIG. 1 employs a cloud computing environment for configuring the counter-information accumulation server 20, the analysis data accumulation server 30, and the Web server 40.

Further, the counter-information accumulation server 20, the analysis data accumulation server 30, and the Web server 40 can be disposed inside the user system US, which is on-premises environment. The hardware configuration, software configuration and processing of the information processing system 1 used with the cloud computing environment or the on-premises environment are the same as those of the information processing system 1 of FIG. 1. Therefore, the same description is omitted.

As to the above described the information processing system 1, the access right to daily data and monthly data of the output apparatus 10 used in the service-use company can be appropriately controlled in view of one or more service users in one or more service-use companies and one or more vendor persons of one or more vendors.

In the above described embodiment, the count value is apparatus log information of the output apparatus 10. The apparatus log information of the output apparatus 10 includes, for example, operating time of the output apparatus 10, image data amount and number of images generated and output by the output apparatus 10, communication data amount of the output apparatus 10, time information when data is output from the output apparatus 10, and data amount that is output from the output apparatus 10. Further, the group that provides services is an example of a service providing group, and the group that receives services is an example of the service-use group.

Further, the information processing system 1 described in the embodiment is just one example, and various system configurations can be used in accordance with the use or purpose.

Reports of the image processing apparatuses used in a service user environment can be accessed by one or more service users in a service user company having a service user environment, and also by one or more persons of a service providing company (e.g. vendor of image processing apparatus) that provides services to the service user company to check an operation status of the image processing apparatuses, in which the scope of the report that can be accessed by the one or more persons of the service providing company is required to be limited in view of the information security.

However, in a case when a service user company has a plurality of organizations (e.g., a plurality of bases in the United States and Japan) and receives services from a plurality of vendors that provide services to a part of organizations of the service user company (e.g., organization in a base in Japan), the scope of the report that can be accessed by each vendor may not be controlled appropriately.

As to the above described embodiment information processing system, the information processing system can control the access right of apparatus log information of the output apparatus in consideration of one or more entities receiving the service and another one or more one or more providing the services.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. For example, the CPU can be implemented by one or more processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus."

Numerous additional modifications and variations for the modules, the units, and the apparatuses, and the systems are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

What is claimed is:

1. A system to control an access right to apparatus log information of one or more output apparatuses, the system comprising:

a memory configured to store group hierarchical information indicating a hierarchical relationship of a plurality of service-use groups including a first service-use group including a first service user, and a second service-use group including a second service user, and group relationship information associating the first service-use group with a first service provider group including a first service provider person, and associating the second service-use group with a second service provider group including a second service provider person; and circuitry configured to, determine the access right to the apparatus log information of any of the one or more output apparatuses for the first service user, the second service user, the first service provider person, and the second service provider person selectively, based on verifying that the first service user has an access right to the one or more output apparatuses that are possessed by the first service-use group, set, for the first service user, the access right to allow access to the apparatus log information of the one or more output apparatuses possessed by the first service-use group, based on verifying that the second service user has an access right to the one or more output apparatuses that are possessed by the second service-use group, set, for the second service user, the access right to allow access to the apparatus log information of the one or more output apparatuses that are possessed by the second service-use group, based on verifying that the first service provider person has an access right to any of the one or more output apparatuses that are possessed by the first service-use group and/or the second service-use group, set, for the first service provider person, the access right to allow access to the apparatus log information of any of the one or more output apparatuses that are possessed by the first service-use group and/or the second service-use group, based on verifying that the second service provider person has an access right to any of the one or more output apparatuses that are possessed by the first service-use group and/or the second service-use group, set, for the second service provider person, the access right to the to allow access to the apparatus log information of the one or more output apparatuses that are possessed by the first service-use group and/or the second service-use group, exclude the first service provider person from an access right to access the apparatus log information of any of the one or more output apparatuses possessed by the second service-use group based on the group relationship information indicating that the second service-use group is a lower-level group than the first service-use group, accumulate a count value from any of the one or more output apparatuses, wherein the count value indicates a number of times that the any of the one or more output apparatuses is used over a time period, and based on verifying that a user has the access right to the apparatus log information, present the count value to the user.

2. The system of claim 1, wherein the circuitry is further configured to, based on the second service-use group being a subsidiary of the first service-use group, set, for the first service user, the access right to allow access to the apparatus log information of any of the one or more output apparatuses that are possessed by the second service-use group.

3. The system of claim 1, wherein
the first service provider is a vendor that provides any of the one or more output apparatuses to the first service-use group and/or the second service-use group, and
the second service provider is another vendor that provides any of the one or more output apparatuses to the first service-use group and/or the second service-use group.

4. The system of claim 1, wherein the circuitry is further configured to, based on a first user being directly associated with a group and having an access right to access any of the one or more output apparatuses that are possessed by the group, and based on a second user being indirectly associated with the group and also having the access right to access any of the one or more output apparatuses that are possessed by the group, identify the access right of the first user as a priority of access right over the access right of the second user.

5. A method of controlling an access right to apparatus log information of one or more output apparatuses, the method comprising:
storing, in a memory, group hierarchical information indicating a hierarchical relationship of a plurality of service-use groups including a first service-use group including a first service user, and a second service-use group including a second service user, and group relationship information associating the first service-use group with a first service provider group including a first service provider person, and associating the second service-use group with a second service provider group including a second service provider person;
determining the access right to the apparatus log information of any of the one or more output apparatuses for the first service user, the second service user, the first service provider person, and the second service provider person selectively;
setting, for the first service user, the access right to allow access to the apparatus log information of any of the one or more output apparatuses that are possessed by the first service-use group when successfully verifying that the first service user has the access right to any of the one or more output apparatuses that are possessed by the first service-use group;
setting, for the second service user, the access right to allow access to the apparatus log information of any of the one or more output apparatuses that are possessed by the second service-use group when successfully verifying that the second service user has the access right to the any of the one or more output apparatuses that are possessed by the second service-use group;
setting, for the first service provider person, the access right to allow access to the apparatus log information of any of the one or more output apparatuses that are possessed by the first service-use group and/or the second service-use group based on the first service provider person having the access right to any of the one or more output apparatuses that are possessed by the first service-use group and/or the second service-use group;
setting, for the second service provider person, the access right to allow access to the apparatus log information of any of the one or more output apparatuses that are possessed by the first service-use group and/or the second service-use group based on the second service provider person having the access right to any of the one or more output apparatuses that are possessed by the first service-use group and/or the second service-use group;
excluding the first service provider person from an access right to access the apparatus log information of any of the one or more output apparatuses that are possessed by the second service-use group based on the group relationship information indicating that the second service-use group is a lower-level group than the first service-use group;
accumulate a count value from any of the one or more output apparatuses, wherein the count value indicates a number of times that the any of the one or more output apparatuses is used over a time period; and
based on verifying that a user has the access right to the apparatus log information, present the count value to the user.

6. The method of claim 5, further comprising:
based on the second service-use group being a subsidiary of the first service-use group, setting, for the first service user, the access right to the apparatus log information of any of the one or more output apparatuses that are possessed by the second service-use group.

7. The method of claim 5, wherein
the first service provider is a vendor that provides any of the one or more output apparatuses to any of the first service-use group and the second service-use group, and
the second service provider is another vendor that provides any of the one or more output apparatuses to any of the first service-use group and the second service-use group.

8. The method of claim 5, wherein,
the accumulating of the count value includes accumulating a count value of another one of the one or more output apparatuses over the time period, wherein the another one of the one or more output apparatuses is also possessed by the group, and
the presenting the count value to the user includes presenting a count value of the one or more output apparatuses possessed by the group over the time period, including the count value of the any of the one or more output apparatuses that are possessed by the group and the count value of the another one of the one or more output apparatuses that are possessed by the group.

9. The method of claim 5, wherein,
the method further comprises:
identifying a closing time point for the time period for the group, and
receive from the any of the one or more output apparatuses a periodic count value over a placement period, and
the accumulating of the count value includes, based on the placement period of the periodic count value being before the closing time point for the time period for the group, including the periodic count value in the count value for the any of the one or more output apparatuses for the time period.

10. The method of claim 5, further comprising:
based on a first user being directly associated with a group and having an access right to access any of the one or more output apparatuses that are possessed by the group, and based on a second user being indirectly associated with the group and also having the access right to access any of the one or more output apparatuses that are possessed by the group, identifying the access right of the first user as a priority of access right over the access right of the second user.

11. An information processing apparatus to control an access right to apparatus log information of one or more output apparatuses, the information processing apparatus comprising:
a memory configured to store group hierarchical information indicating a hierarchical relationship of a first service-use group including a first service user, and a second service-use group including a second service user, and group relationship information associating the first service-use group with a first service provider group including a first service provider person, and associating the second service-use group with a second service provider group including a second service provider person; and
circuitry configured to,
determine the access right to the apparatus log information of any of the one or more output apparatuses for the first service user, the second service user, the first service provider person, and the second service provider person selectively,
based on verifying that the first service user has an access right to any of the one or more output apparatuses that are possessed by the first service-use group, set, for the first service user, the access right to allow access to the apparatus log information of any of the one or more output apparatuses that are possessed by the first service-use group,
based on verifying that the second service user has an access right to any of the one or more output apparatuses that are possessed by the second service-use group, set, for the second service user, the access right to allow access to the apparatus log information of any of the one or more output apparatuses that are possessed by the second service-use group,
based on verifying that the first service provider person has an access right to any of the one or more output apparatuses that are possessed by any of the first service-use group and the second service-use group, set, for the first service provider person, the access right to allow access to the apparatus log information of any of the one or more output apparatuses that are possessed by any of the first service-use group and the second service-use group,
based on verifying that the second service provider person has an access right to any of the one or more output apparatuses that are possessed by any of the first service-use group and the second service-use group, set, for the second service provider person, the access right to allow access to the apparatus log information of any of the one or more output apparatuses that are possessed by any of the first service-use group and the second service-use group,
exclude the first service provider person from an access right to access the apparatus log information of any of the one or more output apparatuses that are possessed by the second service-use group based on the group relationship information indicating that the second service-use group is a lower-level group than the first service-use group,
accumulate a count value from any of the one or more output apparatuses, wherein the count value indicates a number of times that the any of the one or more output apparatuses is used over a time period, and
based on verifying that a user has the access right to the apparatus log information, present the count value to the user.

12. The information processing apparatus of claim 11, wherein the circuitry is further configured to, based on the second service-use group being a subsidiary of the first service-use group, set, for the first service user, the access right to the apparatus log information of any of the one or more output apparatuses that are possessed by the second service-use group.

13. The information processing apparatus of claim 11, wherein
the first service provider is a vendor that provides any of the one or more output apparatuses to the first service-use group and/or the second service-use group, and
the second service provider is another vendor that provides any of the one or more output apparatuses to the first service-use group and/or the second service-use group.

14. The information processing apparatus of claim 11, wherein,
the accumulate of the count value includes accumulating a count value of another one of the one or more output apparatuses over the time period, wherein the another one of the one or more output apparatuses is also possessed by the group, and
the present of the count value to the user includes presenting a count value of the one or more output apparatuses possessed by the group over the time period, including the count value of the any of the one or more output apparatuses that are possessed by the group and the count value of the another one of the one or more output apparatuses that are possessed by the group.

15. The information processing apparatus of claim 11, wherein,
the circuitry is further configured to,
identify a closing time point for the time period for the group, and
receive from the any of the one or more output apparatuses a periodic count value over a placement period, and
the accumulate of the count value includes, based on the placement period of the periodic count value being before the closing time point for the time period for the group, including the periodic count value in the count value for the any of the one or more output apparatuses for the time period.

16. The information processing apparatus of claim 11, wherein,
the accumulate of the count value includes accumulating a count value of another one of the one or more output apparatuses over the time period, wherein the another one of the one or more output apparatuses is also possessed by the group, and
the present of the count value to the user includes presenting a count value of the one or more output apparatuses possessed by the group over the time period, including the count value of the any of the one or more output apparatuses that are possessed by the group and the count value of the another one of the one or more output apparatuses that are possessed by the group.

17. The information processing apparatus of claim 11, wherein the circuitry is further configured to, based on a first user being directly associated with a group and having an access right any of the one or more output apparatuses that are possessed by the group, and based on a second user being indirectly associated with the group and also having the access right to access any of the one or more output apparatuses that are possessed by the group, identify the access right of the first user as a priority of access right over the access right of the second user.

18. The information processing apparatus of claim 11, wherein
the circuitry is further configured to,
identify a closing time point for the time period for the group, and
receive from the any of the one or more output apparatuses a periodic count value over a placement period, and
the accumulating of the count value includes, based on the placement period of the periodic count value being before the closing time point for the time period for the group, including the periodic count value in the count value for the any of the one or more output apparatuses for the time period.

* * * * *